(12) United States Patent
Mizuno et al.

(10) Patent No.: US 12,253,677 B2
(45) Date of Patent: Mar. 18, 2025

(54) RETINAL PROJECTION DEVICE AND NEAR EYE WEARABLE DEVICE

(71) Applicant: TDK CORPORATION, Tokyo (JP)

(72) Inventors: Tomohito Mizuno, Tokyo (JP); Hideaki Fukuzawa, Tokyo (JP); Kit Chu Lam, Shanghai (CN)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/395,876

(22) Filed: Dec. 26, 2023

(65) Prior Publication Data

US 2024/0219723 A1     Jul. 4, 2024

(30) Foreign Application Priority Data

Dec. 28, 2022   (JP) .................... 2022-211779

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 27/0179* (2013.01); *G02B 2027/0178* (2013.01); *G02B 2027/0187* (2013.01)

(58) Field of Classification Search
CPC .... G02B 27/0172–2027/0187; G02B 27/0093; G06F 3/011–013
See application file for complete search history.

(56) References Cited

U.S. PATENT DOCUMENTS

| | | |
|---|---|---|
| 2018/0113310 A1 | 4/2018 | Rolland et al. |
| 2019/0369401 A1 | 12/2019 | Rolland et al. |
| 2021/0239979 A1* | 8/2021 | Georgiou ........... G02B 27/0172 |
| 2022/0050225 A1* | 2/2022 | Li ..................... G02B 5/0858 |
| 2023/0168513 A1* | 6/2023 | Yeh ................... G02B 27/0081 |
| | | 359/630 |
| 2023/0393396 A1* | 12/2023 | Cho ................... G02B 27/0149 |

* cited by examiner

*Primary Examiner* — Hang Lin
(74) *Attorney, Agent, or Firm* — Oliff PLC

(57) ABSTRACT

A retinal projection device includes: a projector module including a light source that emits laser light and a movable mirror that performs scanning with the laser light; a reflector that projects an image onto a retina of a user wearing the near eye wearable device by reflecting the laser light having passed through the movable mirror and irradiating the retina with reflected light; and a controller that determines an irradiation range of the reflector to be irradiated with the laser light in accordance with a position of a pupil of the user and controls the projector module to irradiate the irradiation range with the laser light. The reflector includes a plurality of unit regions provided along a surface of a lens of the near eye wearable device, and the surface faces an eyeball of the user. The irradiation range is a part of the plurality of unit regions.

7 Claims, 20 Drawing Sheets

RETINAL PROJECTION DEVICE AND NEAR EYE WEARABLE DEVICE

CROSS-REFERENCE TO RELATED APPLICATION

This application is based on Japanese Patent Application No. 2022-211779 filed with the Japan Patent Office on Dec. 28, 2022 and claims the benefit of priority thereto. The entire contents of the Japanese patent application are incorporated herein by reference.

TECHNICAL FIELD

The present disclosure relates to a retinal projection device and a near eye wearable device.

BACKGROUND

Near eye wearable devices such as smart glasses are known. For example, US 2019/0369401 A1 discloses a near eye display assembly including an image source located in a temple, a mirror for redirecting light from the image source, a secondary mirror located proximal to a nose of a user, and a combiner located in front of an eye of the user. US 2018/0113310 A1 discloses a near eye display assembly including an image source and a combiner including a nanostructured surface optically coupled to the image source, wherein the image information is formed on the nanostructured surface of the combiner to be conveyed within a field of view of the user.

SUMMARY

In the near eye display assemblies described in US 2019/0369401 A1 and US 2018/0113310 A1, a user may not correctly recognize an image when the user moves eyes of the user. In the present technical field, it is desired to expand the movable range (eye box) of the eye in which a user can correctly recognize an entire image.

The present disclosure describes a retinal projection device and a near eye wearable device capable of expanding an eye box.

A retinal projection device according to one aspect of the present disclosure is a device to be mounted on a near eye wearable device. The retinal projection device includes: a projector module including a light source that emits laser light and a movable mirror that performs scanning with the laser light; a reflector that projects an image onto a retina of a user wearing the near eye wearable device by reflecting the laser light having passed through the movable mirror and irradiating the retina with reflected light; and a controller that determines an irradiation range of the reflector to be irradiated with the laser light in accordance with a position of a pupil of the user and controls the projector module to irradiate the irradiation range with the laser light. The reflector includes a plurality of unit regions provided along a surface of a lens of the near eye wearable device, and the surface faces an eyeball of the user. Each of the plurality of unit regions is a nanostructure configured to reflect the laser light at a reflection angle corresponding to a position where the unit region is provided when the laser light having passed through the movable mirror is incident on the unit region. The irradiation range is a part of the plurality of unit regions.

In the retinal projection device, the plurality of unit regions is provided along the surface of the lens of the near eye wearable device facing the eyeball of the user, a part of the unit regions is determined as the irradiation range in accordance with the position of the pupil of the user, and the projector module is controlled so that the laser light is applied to the irradiation range. Therefore, even if the user moves the eyes of the user, the reflected light can be applied to the retina of the user, so that the user can correctly recognize the image. As described above, the eye box can be expanded.

In some embodiments, the controller may determine a first irradiation range as the irradiation range when the pupil is located at a first position, and may determine a second irradiation range as the irradiation range when the pupil is located at a second position different from the first position. The first irradiation range may partially overlap the second irradiation range. In this case, unit regions included in the portion where the first irradiation range and the second irradiation range overlap can be used for both the first irradiation range and the second irradiation range.

In some embodiments, the reflector may be divided into a plurality of sections, and the controller may determine one of the plurality of sections as the irradiation range. In this case, since one of the sections just has to be determined as the irradiation range in accordance with the position of the pupil, the control of the projector module by the controller can be simplified.

In some embodiments, the retinal projection device may further include a movement mechanism that moves the projector module. The controller may cause the movement mechanism to move the projector module in accordance with the position of the pupil. There is a limit to the range to which the laser light can be applied only by controlling the movable mirror. In order to solve this problem, by moving the projector module, the range to which the laser light can be applied can be expanded.

In some embodiments, the laser light may contain a first component for projecting an image onto the retina and a second component for detecting the position of the pupil. The plurality of unit regions may include a unit region for the first component and a unit region for the second component. In this case, it is not necessary to provide another light source for detecting the position of the pupil, so that the size of the retinal projection device can be reduced.

In some embodiments, each of the plurality of unit regions may be a laminate including a first metal layer, a dielectric layer, and a second metal layer in sequence in a first direction intersecting the surface. The second metal layer may include a plurality of metal bodies arranged in a second direction intersecting the first direction. According to this configuration, in each unit region, the second metal layer is provided above the first metal layer via the dielectric layer in the first direction, and the plurality of metal bodies is arranged in the second direction in the second metal layer, so that each unit region can function as a reflective mirror. Therefore, the reflection angle can be controlled by adjusting the size of each metal body.

In some embodiments, each of the plurality of unit regions may have a length in accordance with the reflection angle in the second direction. A size of each of the plurality of metal bodies may be set so that a phase change amount of the reflected light linearly increases or decreases from a first end toward a second end in the second direction of the unit region. In this case, a plane wave having a gradient of a function indicating a relationship between a position in the second direction and a phase change amount of the reflected light as a wave vector is generated. This makes it possible to adjust the reflection angle by the lengths of the unit regions in the second direction.

A near eye wearable device according to another aspect of the present disclosure includes the above-described retinal projection device and the lens. In the near eye wearable device, the eye box can be expanded.

According to each aspect and each embodiment of the present disclosure, the eye box can be expanded.

DETAILED DESCRIPTION

Figure 1:
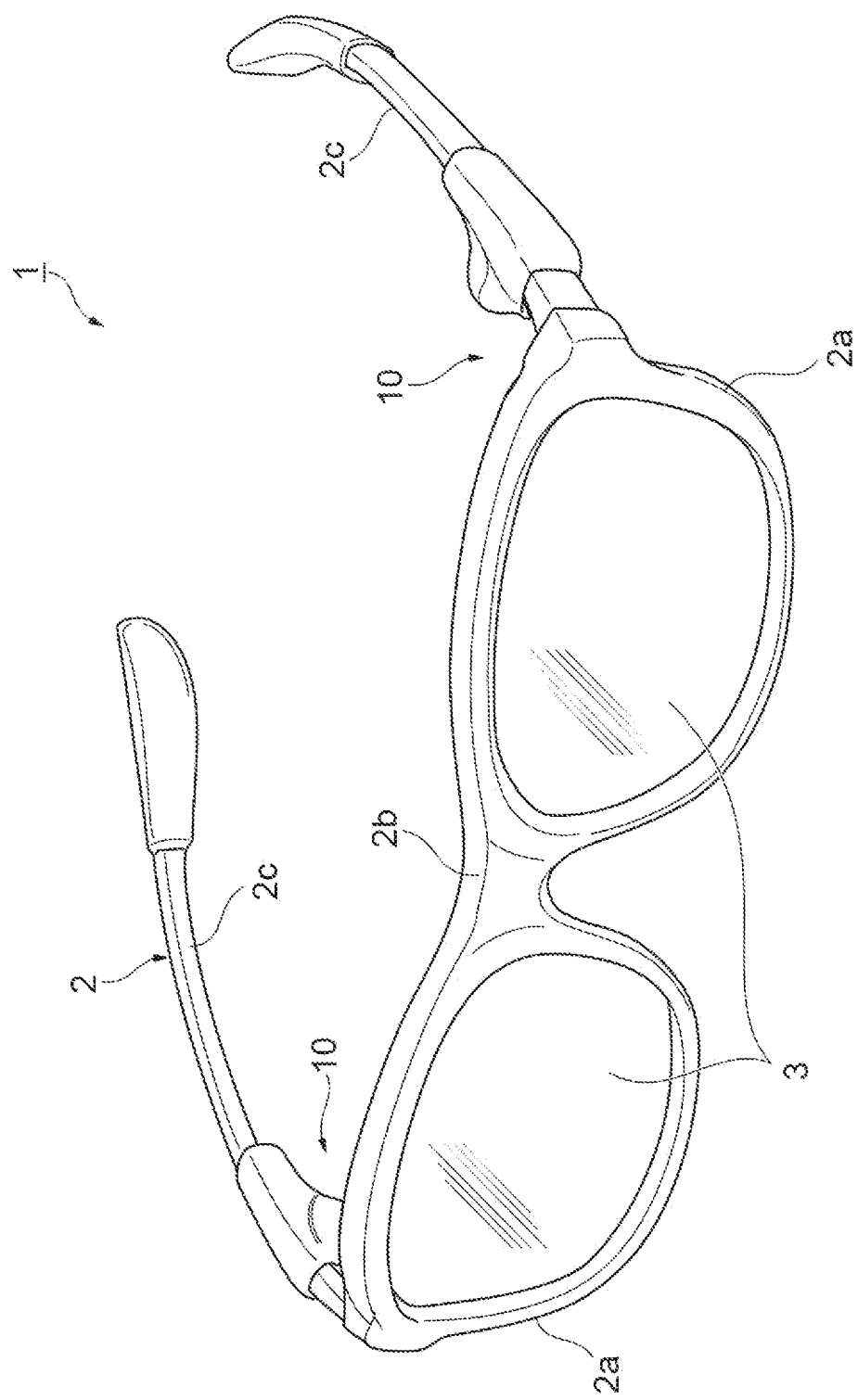
FIG. 1 is a perspective view showing an appearance of a near eye wearable device including a retinal projection device according to an embodiment.

Hereinafter, embodiments of the present disclosure will be described in detail with reference to the drawings. In the description of the drawings, the same elements are denoted by the same reference numerals, and redundant description will be omitted. In each figure, an XYZ coordinate system may be shown. The Y-axis direction is a direction intersecting (for example, orthogonal to) the X-axis direction (second direction) and the Z-axis direction (first direction). The Z-axis direction is a direction intersecting (for example, orthogonal to) the X-axis direction and the Y-axis direction.

A near eye wearable device including a retinal projection device according to an embodiment will be described with reference to FIG. 1. FIG. 1 is a perspective view showing an appearance of a near eye wearable device including a retinal projection device according to an embodiment. A near eye wearable device 1 shown in FIG. 1 is a device for superimposing an image on the field of view of the real world. The near eye wearable device 1 is, for example, a head-mounted device, and may take the form of an eyeglass type, a goggle type, a hat type, a helmet type, or the like. Examples of the near eye wearable device 1 include smart glasses such as augmented reality (AR) glasses and mixed reality (MR) glasses. The near eye wearable device 1 includes a frame 2, a lens 3, and a retinal projection device 10.

The frame 2 includes a pair of rims 2a, a bridge 2b, and a pair of temples 2c. The rim 2a is a portion for holding the lens 3. The bridge 2b is a portion connecting the pair of rims 2a. The temple 2c extends from the rim 2a and is a portion to be put on an ear of a user. The frame 2 may be a rimless frame. The lens 3 has an inner surface 3a (see FIG. 2) facing an eyeball E (see FIG. 3) of a user wearing the near eye wearable device 1.

The retinal projection device 10 is a device for directly projecting (drawing) an image onto a retina RE (see FIG. 3) of a user wearing the near eye wearable device 1. The retinal projection device 10 is mounted on the near eye wearable device 1. In the present embodiment, the near eye wearable device 1 includes two retinal projection devices 10 in order to project an image onto both the right and left retinas, but may include only one of the retinal projection devices 10.

Figure 2:
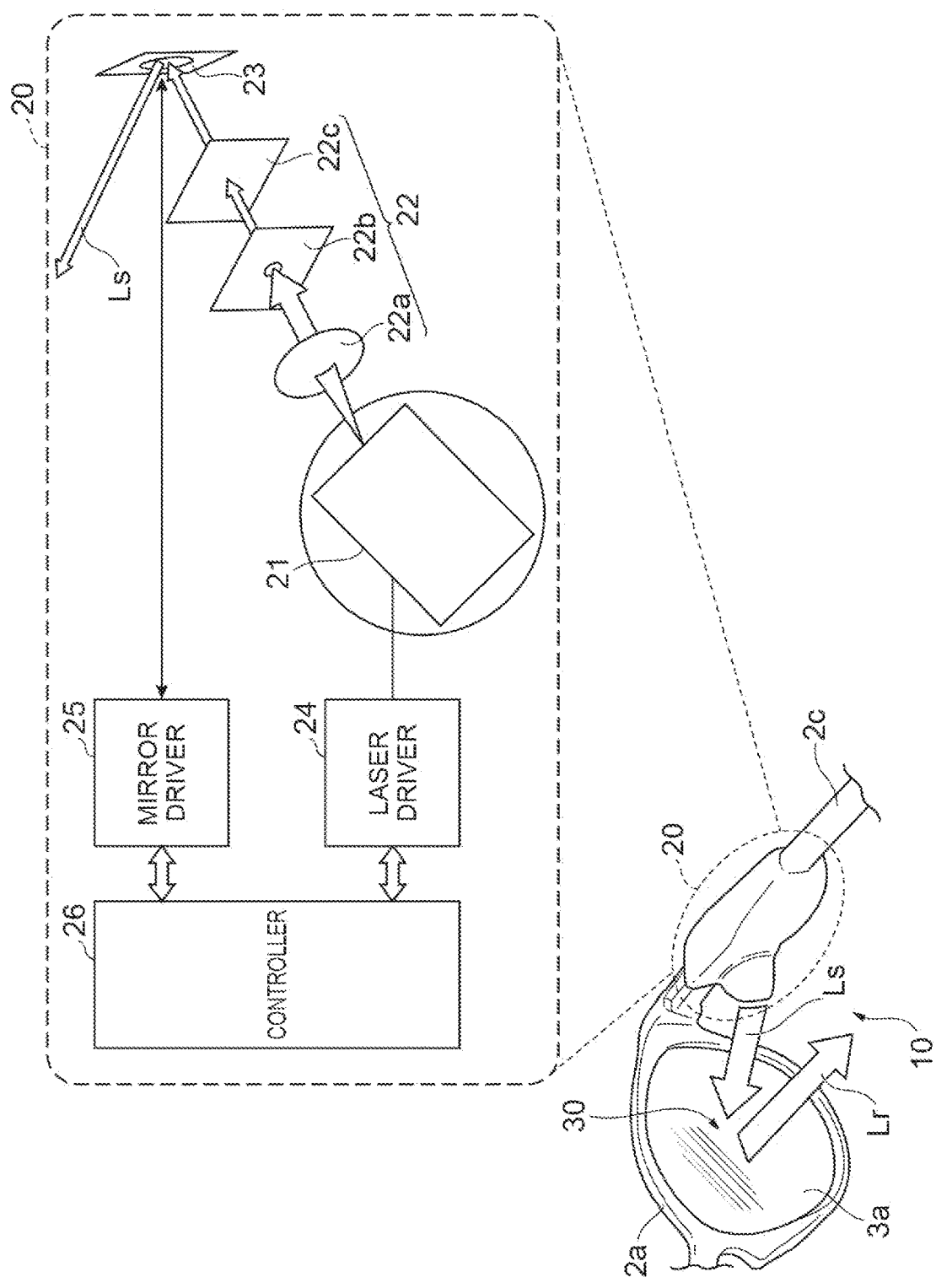
FIG. 2 is a configuration diagram schematically showing the retinal projection device shown in FIG. 1.
Figure 3:
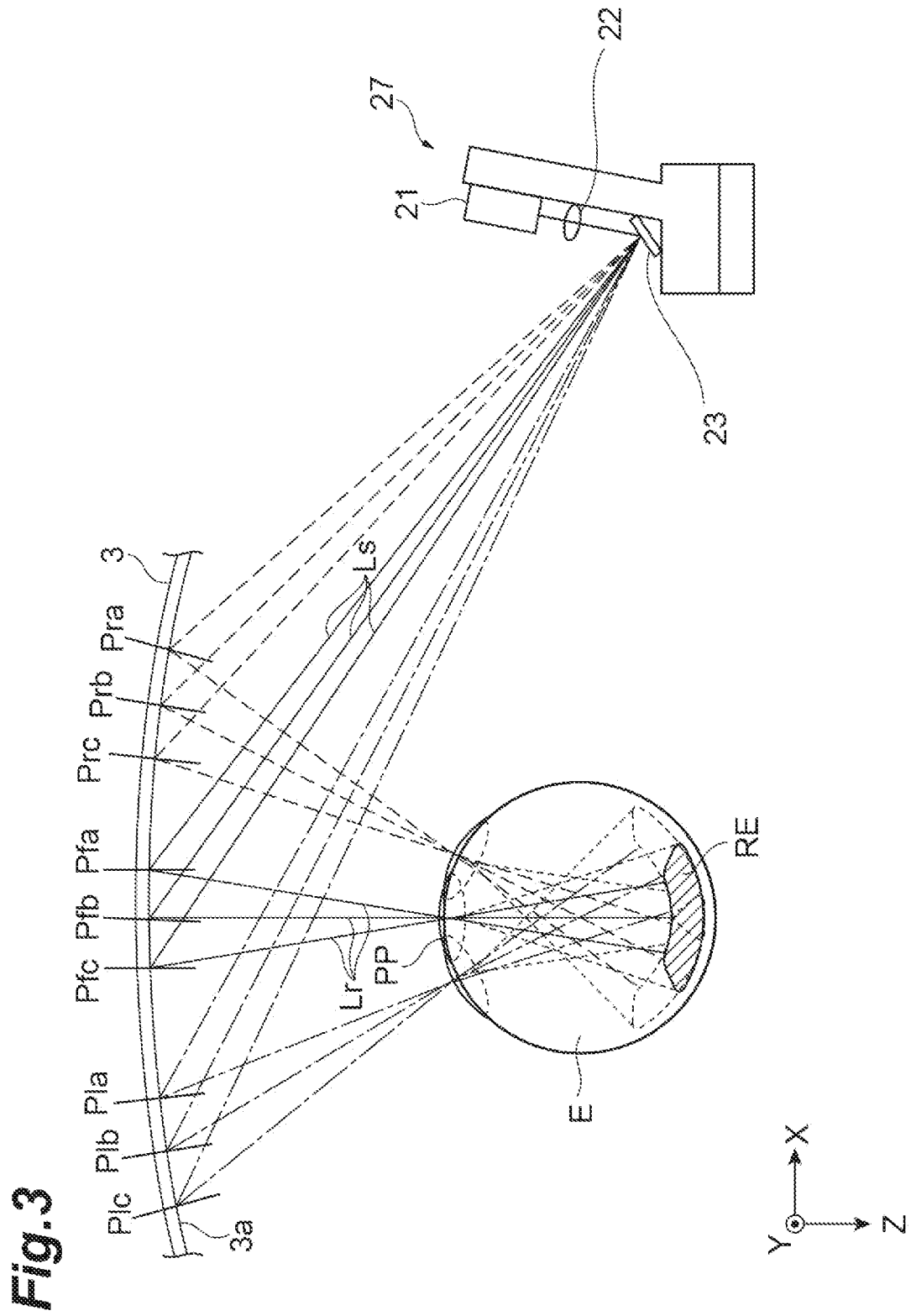
FIG. 3 is a diagram for explaining the operating principle of the retinal projection device shown in FIG. 1.
Figure 4:
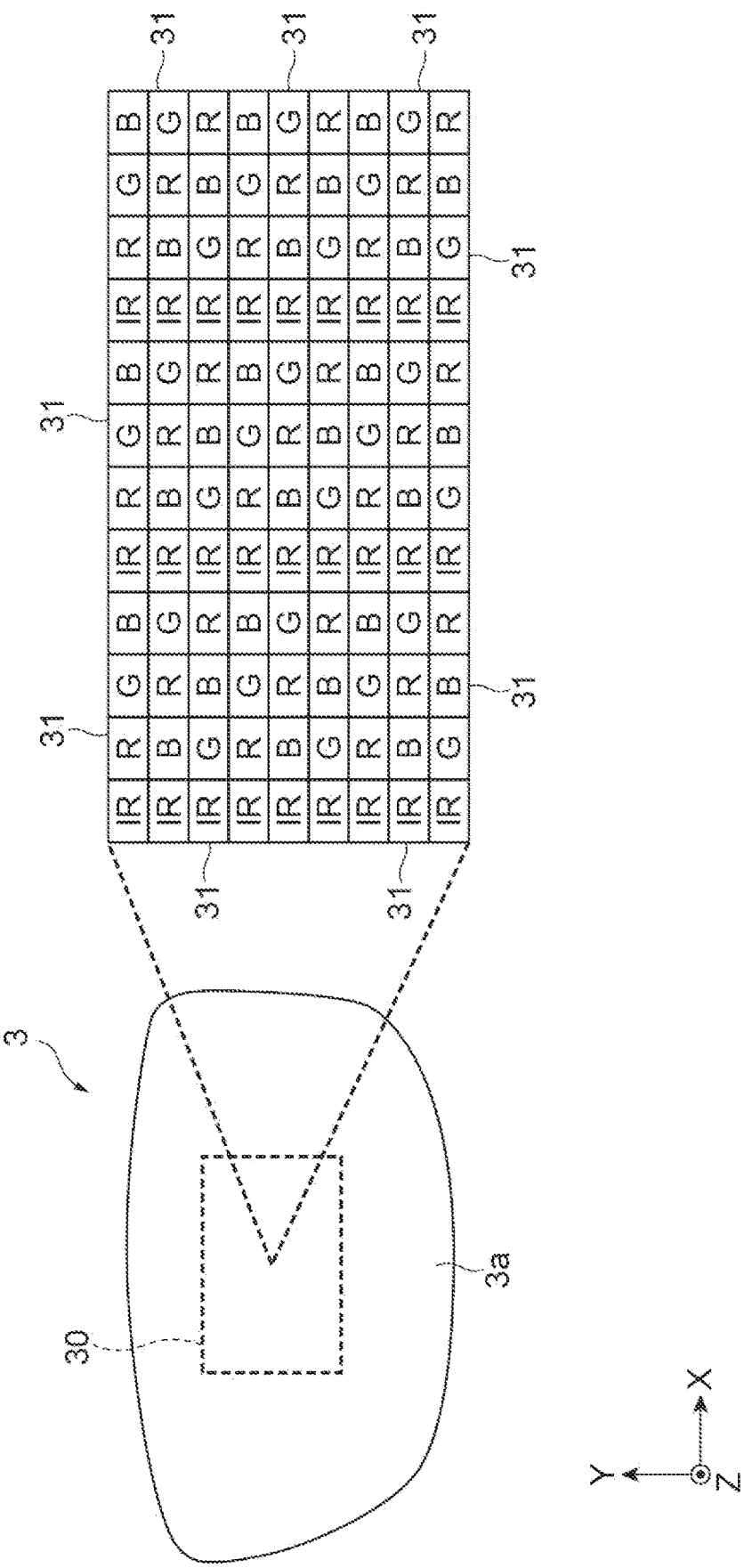
FIG. 4 is an enlarged view of the reflector shown in FIG. 2.

Next, the retinal projection device 10 will be described in detail with reference to FIGS. 2 to 4. FIG. 2 is a configuration diagram schematically showing the retinal projection device shown in FIG. 1. FIG. 3 is a diagram for explaining the operating principle of the retinal projection device shown in FIG. 1. FIG. 4 is an enlarged view of the reflector shown in FIG. 2. As shown in FIG. 2, the retinal projection device 10 includes an optical engine 20 and a reflector 30.

The optical engine 20 is a device which generates a laser light Ls having a color and intensity corresponding to a pixel of an image to be projected onto the retina RE and emits the laser light Ls to the reflector 30. The optical engine 20 is mounted on each temple 2c. The optical engine 20 includes a light source unit 21 (light source), optical components 22, a movable mirror 23, a laser driver 24, a mirror driver 25, and a controller 26.

The light source unit 21 emits a laser light. As the light source unit 21, for example, a full-color laser module is used. The light source unit 21 includes a red laser diode, a green laser diode, a blue laser diode, a near-infrared laser diode, and a multiplexer that multiplexes laser lights emitted from laser diodes into one laser light. The light source unit 21 emits the multiplexed laser light.

The multiplexed laser light contains a component having a wavelength of red (red component), a component having a wavelength of green (green component), a component having a wavelength of blue (blue component), and a component having a wavelength of near-infrared light (near-infrared component). The red, green, and blue components are components (first components) for projecting an image onto the retina. The near-infrared component is a component (second component) for detecting the position of the pupil. It should be noted that the position of the pupil is the position of the pupil in the eyeball, and may be expressed as the direction of the pupil or the gaze direction. The light source unit 21 emits a laser light having a color and intensity corresponding to a pixel of an image to be projected onto the retina RE.

The optical components 22 are components that optically process the laser light emitted from the light source unit 21. In the present embodiment, the optical components 22 include a collimator lens 22a, a slit 22b, and a neutral density filter 22c. The collimator lens 22a, the slit 22b, and the neutral density filter 22c are arranged in this order along the optical path of the laser light. The optical components 22 may have other configurations.

The movable mirror 23 is a member for performing scanning with the laser light Ls. The movable mirror 23 is provided in a direction in which the laser light processed by the optical components 22 is emitted. The movable mirror 23 is configured to be swingable about an axis extending in the horizontal direction (X-axis direction) of the lens 3 and about an axis extending in the vertical direction (Y-axis direction) of the lens 3, for example, and reflects the laser light while changing the angle in the X-axis direction and the Y-axis direction. As the movable mirror 23, for example, a micro electro mechanical systems (MEMS) mirror is used.

The laser driver 24 is a driving circuit for driving the light source unit 21. The laser driver 24 drives the light source unit 21 based on, for example, the optical power of the laser light and the temperature of the light source unit 21. The mirror driver 25 is a driving circuit for driving the movable mirror 23. The mirror driver 25 swings the movable mirror 23 within a predetermined angle range and at a predetermined timing.

The controller 26 is a device for integrally controlling the optical engine 20. The controller 26 controls the laser driver 24 and the mirror driver 25. The controller 26 determines an irradiation range in accordance with a position of a pupil PP of a user, and controls a projector module 27 so that the laser light Ls is applied to the irradiation range. The irradiation range is a range, to which the laser light Ls is applied, included in the reflector 30. The projector module 27 is a module including the light source unit 21, the optical components 22, and the movable mirror 23. A control method in accordance with the position of the pupil PP will be described later.

The reflector 30 is a member that projects an image onto the retina RE of the user wearing the near eye wearable device 1 by reflecting the laser light Ls having passed through the movable mirror 23 and irradiating the retina RE with reflected light Lr. No image is displayed on the reflector 30. As shown in FIG. 4, the reflector 30 includes a plurality of unit regions 31. The plurality of unit regions 31 is provided along the inner surface 3a of the lens 3. The plurality of unit regions 31 is arranged in a two-dimensional array in the horizontal direction (X-axis direction) and the vertical direction (Y-axis direction) of the lens 3.

The plurality of unit regions 31 includes a unit region 31 for the red component (unit region for first component), a unit region 31 for the green component (unit region for first component), a unit region 31 for the blue component (unit region for first component), and a unit region 31 for the near-infrared component (unit region for second component). In the X-axis direction, one unit region 31 for the near-infrared component and a set including one unit region 31 for the red component, one unit region 31 for the green component, and one unit region 31 for the blue component are alternately arranged.

In a plurality of sets located at the same position in the Y-axis direction and arranged in the X-axis direction, the arrangement order of the unit region 31 for the red component, the unit region 31 for the green component, and the unit region 31 for the blue component is the same. Two sets adjacent to each other in the Y-axis direction are different from each other in the arrangement order. The unit regions 31 for a plurality of near-infrared components located at the same position in the X-axis direction are arranged linearly in the Y-axis direction.

A part of the plurality of unit regions 31 included in the reflector 30 is used as an irradiation range. For example, as shown in FIG. 3, when the pupil PP of the user faces the front, the unit regions 31 provided from the position Pfa to the position Pfc in the X-axis direction are used as the irradiation range. The laser light Ls reflected by the unit region 31 provided at the position Pfa corresponds to a pixel at the right end of the image. The position Pfb is in the middle between the position Pfa and the position Pfc, and the laser light Ls reflected by the unit region 31 provided at the position Pfb corresponds to a pixel in the center of the image. The laser light Ls reflected by the unit region 31 provided at the position Pfc corresponds to a pixel at the left end of the image.

When the pupil PP of the user is directed to the right, the unit regions 31 provided from the position Pra to the position Prc in the X-axis direction are used as the irradiation range. The laser light Ls reflected by the unit region 31 provided at the position Pra corresponds to a pixel at the right end of the image. The position Prb is in the middle between the position Pra and the position Prc, and the laser light Ls reflected by the unit region 31 provided at the position Prb corresponds to a pixel in the center of the image. The laser light Ls reflected by the unit region 31 provided at the position Prc corresponds to a pixel at the left end of the image.

When the pupil PP of the user is directed to the left, the unit regions 31 provided from the position Pla to the position Plc in the X-axis direction are used as the irradiation range. The laser light Ls reflected by the unit region 31 provided at the position Pla corresponds to a pixel at the right end of the image. The position Plb is in the middle between the position Pla and the position Plc, and the laser light Ls reflected by the unit region 31 provided at the position Plb corresponds to a pixel in the center of the image. The laser light Ls reflected by the unit region 31 provided at the position Plc corresponds to a pixel at the left end of the image.

Each unit region 31 is a nanostructure configured to reflect the laser light Ls at a reflection angle $\theta_r$ (see FIG. 6) corresponding to a position where the unit region 31 is provided when the laser light Ls is incident on the unit region 31. The reflection angle $\theta_r$ of each unit region 31 is set so that the laser light Ls (reflected light Lr) reflected by each unit region 31 passes through the center of the pupil PP. Therefore, the incident angle $\theta_i$ and the reflection angle $\theta_r$ are determined by the position where the unit region 31 is provided. The unit region 31 is configured so that the incident angle $\theta_i$ and the reflection angle $\theta_r$ corresponding to the position where the unit region 31 is provided is obtained.

For example, in the unit region 31 provided at the position Pfa, the laser light Ls is incident at an incident angle $\theta_i$ of 30°, and the laser light Ls is reflected at a reflection angle $\theta_r$ of 5° to be emitted as the reflected light Lr. In the unit region 31 provided at the position Pfb, the laser light Ls is incident at an incident angle $\theta_i$ of 40°, and the laser light Ls is reflected at a reflection angle $\theta_r$ of −5° to be emitted as the reflected light Lr. In the unit region 31 provided at the position Pfc, the laser light Ls is incident at an incident angle $\theta_i$ of 50°, and the laser light Ls is reflected at a reflection angle $\theta_r$ of −10° to be emitted as the reflected light Lr.

Here, the incident angle $\theta_i$ is an angle formed by a normal line of a surface irradiated with the laser light Ls and an incident direction of the laser light Ls. The reflection angle $\theta_r$ is an angle formed by a normal line of a surface irradiated with the laser light Ls and an emission direction of the reflected light Lr. In the plane including the laser light Ls and the reflected light Lr, when the reflected light Lr is emitted on the side opposite to the incident light (laser light Ls) with the normal line as a boundary, the reflection angle $\theta_r$ is expressed by a positive value, and when the reflected light Lr is emitted on the same side as the incident light (laser light Ls) with the normal line as a boundary, the reflection angle $\theta_r$ is expressed by a negative value.

Figure 5:
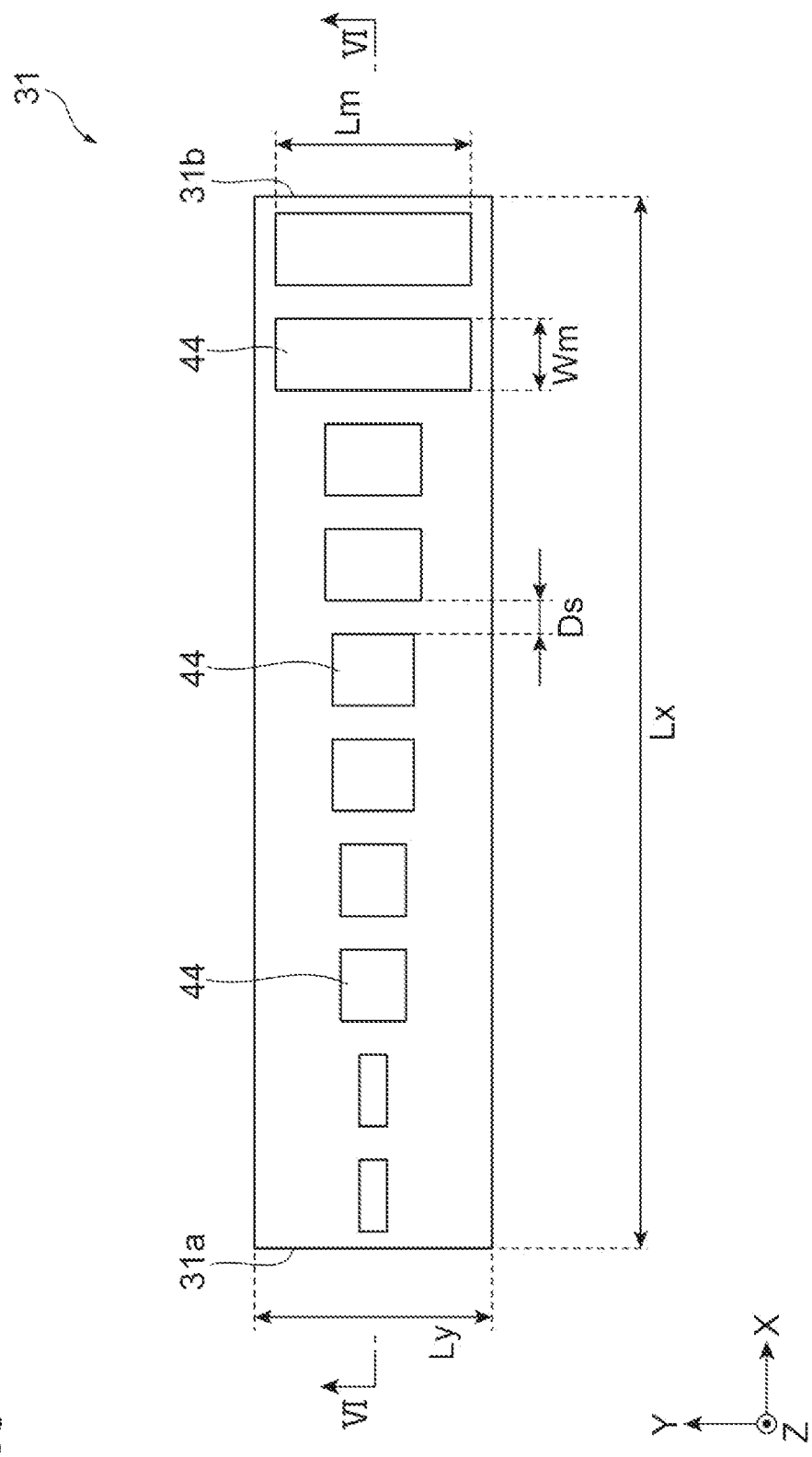
FIG. 5 is a plan view schematically showing an example of the unit region shown in FIG. 4.
Figure 6:
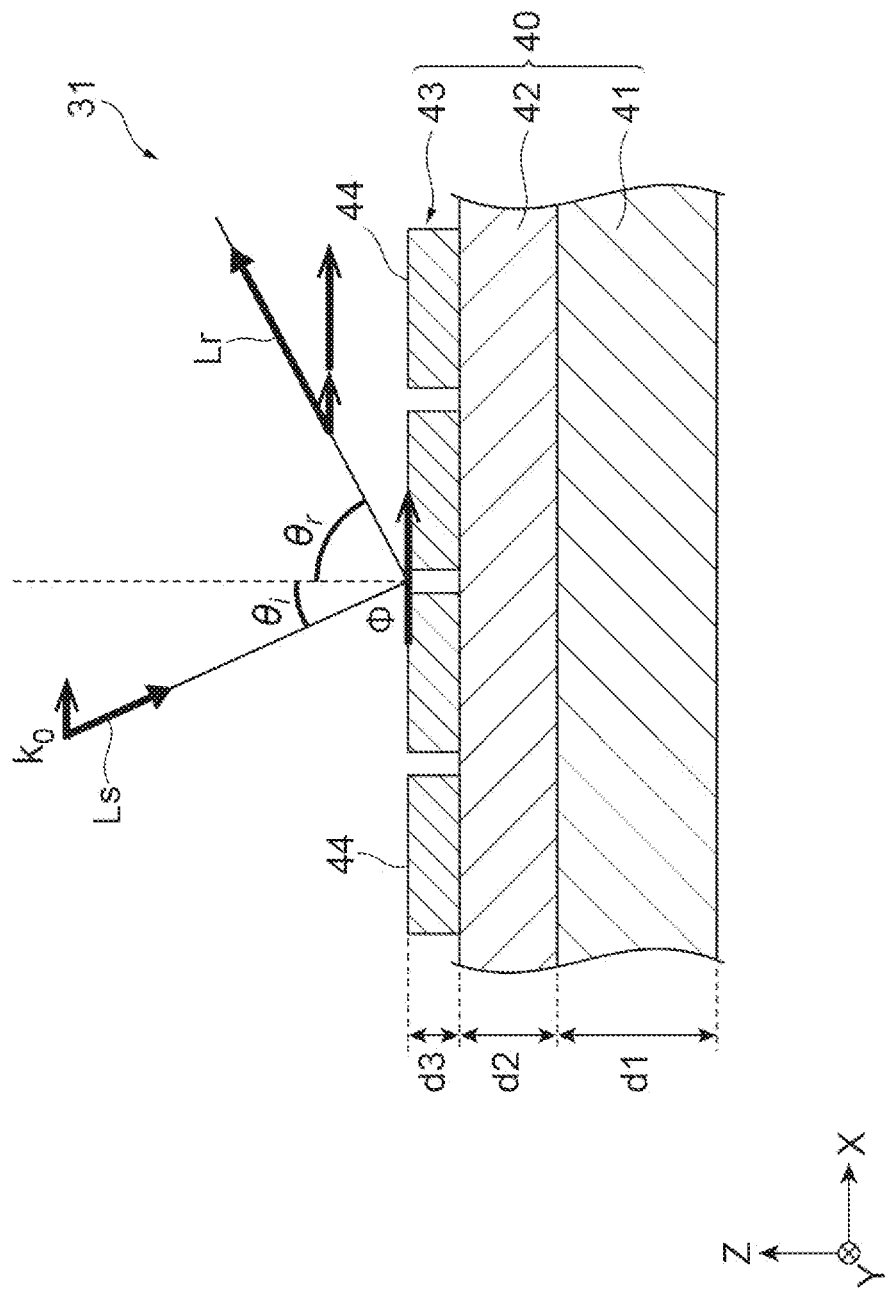
FIG. 6 is a cross-sectional view taken along the line VI-VI of FIG. 5.

Next, the configuration of the unit region 31 will be described with reference to FIGS. 5 and 6. FIG. 5 is a plan view schematically showing an example of the unit region shown in FIG. 4. FIG. 6 is a cross-sectional view taken along the line VI-VI of FIG. 5. As shown in FIGS. 5 and 6, each unit region 31 is a laminate 40 including a metal layer 41 (first metal layer), a dielectric layer 42, and a metal layer 43 (second metal layer) in sequence in the Z-axis direction. The length Ly of the unit region 31 in the Y-axis direction is, for example, about 300 nm. The length Lx of the unit region 31 in the X-axis direction is determined in accordance with the reflection angle $\theta_r$. A method for determining the length Lx will be described later.

The metal layer 41 is a base layer. The metal layer 41 is provided on the inner surface 3a of the lens 3. The metal layer 41 is made of, for example, a metal containing at least one element selected from the group consisting of gold (Au), copper (Cu), silver (Ag), iridium (Ir), ruthenium (Ru), rhodium (Rh), titanium (Ti), tantalum (Ta), tungsten (W), cobalt (Co), iron (Fe), and nickel (Ni). The length (thickness d1) of the metal layer 41 in the Z-axis direction may be any length as long as the metal layer 41 is capable of passing a resonance current and reflecting light. The thickness d1 is, for example, 1 nm to 1000 nm.

The dielectric layer 42 is a layer functioning as a spacer. The dielectric layer 42 is provided on the metal layer 41. The dielectric layer 42 has a dielectric constant that does not interfere with the electromagnetic action of the metal layer 41 and the metal layer 43. The dielectric layer 42 is made of a material that is transparent in the visible light region. The dielectric layer 42 may be made of a material having a high dielectric constant in order to achieve high reflection characteristics. The dielectric layer 42 is made of, for example, one compound selected from the group consisting of silicon oxides (e.g., $SiO_2$), titanium oxides (e.g., $TiO_2$), magnesium oxides (e.g., MgO), and aluminum oxides (e.g., $Al_2O_3$). The length (thickness d2) of the dielectric layer 42 in the Z-axis direction is, for example, 1 nm to 1000 nm.

The metal layer 43 is a layer for exciting electromagnetic resonance together with the metal layer 41. The metal layer 43 is provided on the dielectric layer 42. Similar to the metal layer 41, the metal layer 43 is made of, for example, a metal containing at least one element selected from the group consisting of gold (Au), copper (Cu), silver (Ag), iridium (Ir), ruthenium (Ru), rhodium (Rh), titanium (Ti), tantalum (Ta), tungsten (W), cobalt (Co), iron (Fe), and nickel (Ni).

The metal layer 43 includes a plurality of metal bodies 44 arranged in the X-axis direction. The length (thickness d3) of each metal body 44 in the Z-axis direction is, for example, 1 nm to 1000 nm. The length (width Wm) of each metal body 44 in the X-axis direction is about 100 nm. The length Lm of each metal body 44 in the Y-axis direction is determined in accordance with the reflection angle $\theta_r$. A method for determining the length Lm will be described later. The interval Ds between two metal bodies 44 adjacent to each other in the X-axis direction is set so that the wave front of the reflected light becomes continuous. The interval Ds may have any size as long as the two metal bodies 44 do not come into contact with each other, and is set to, for example, half or less of the wavelength of the incident light (laser light Ls). The interval Ds is, for example, about 20 nm. The plurality of metal bodies 44 is formed by photolithography, for example.

Figure 7:
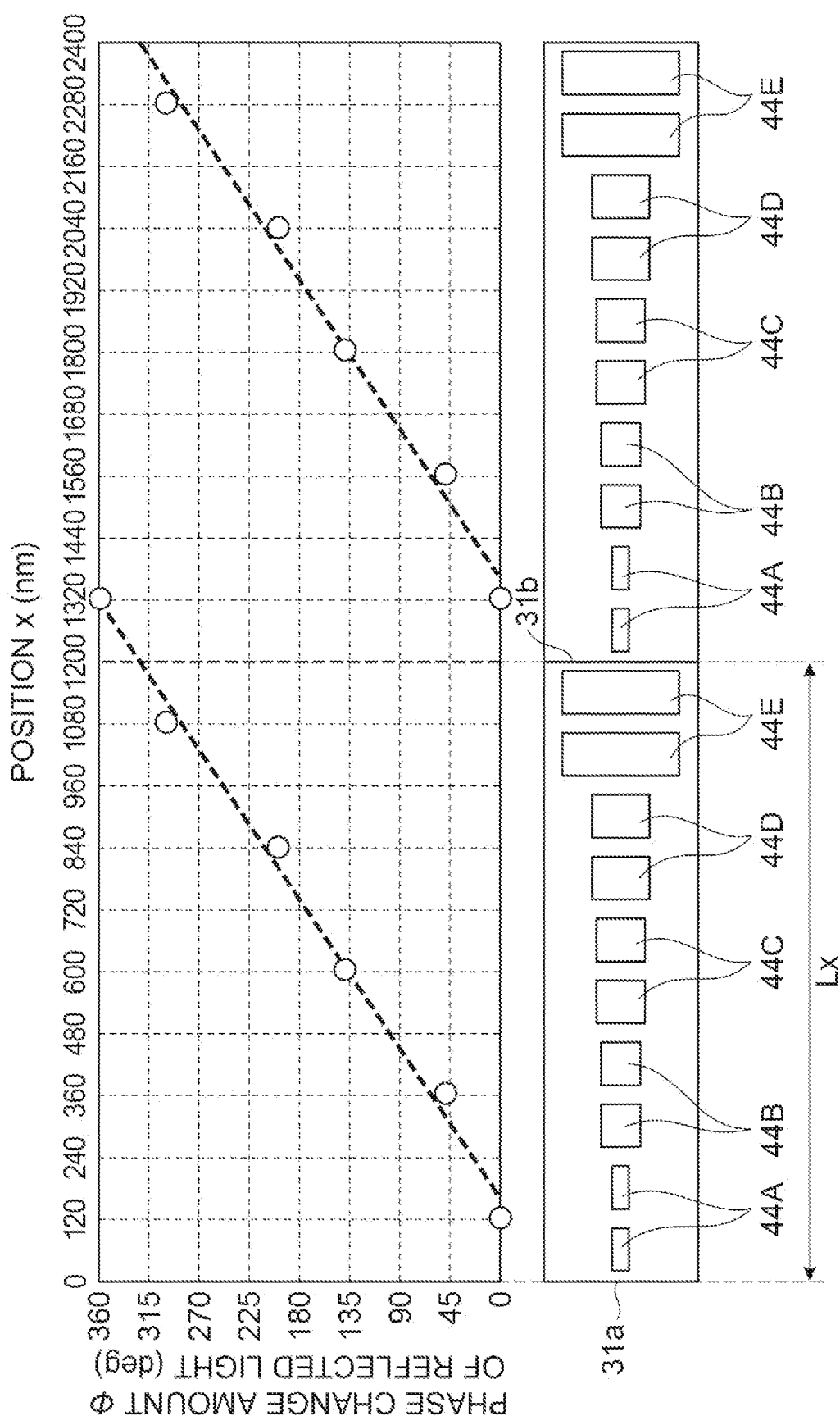
FIG. 7 is a diagram showing a phase change amount of the reflected light at a position in the X-axis direction of the unit region.
Figure 8:
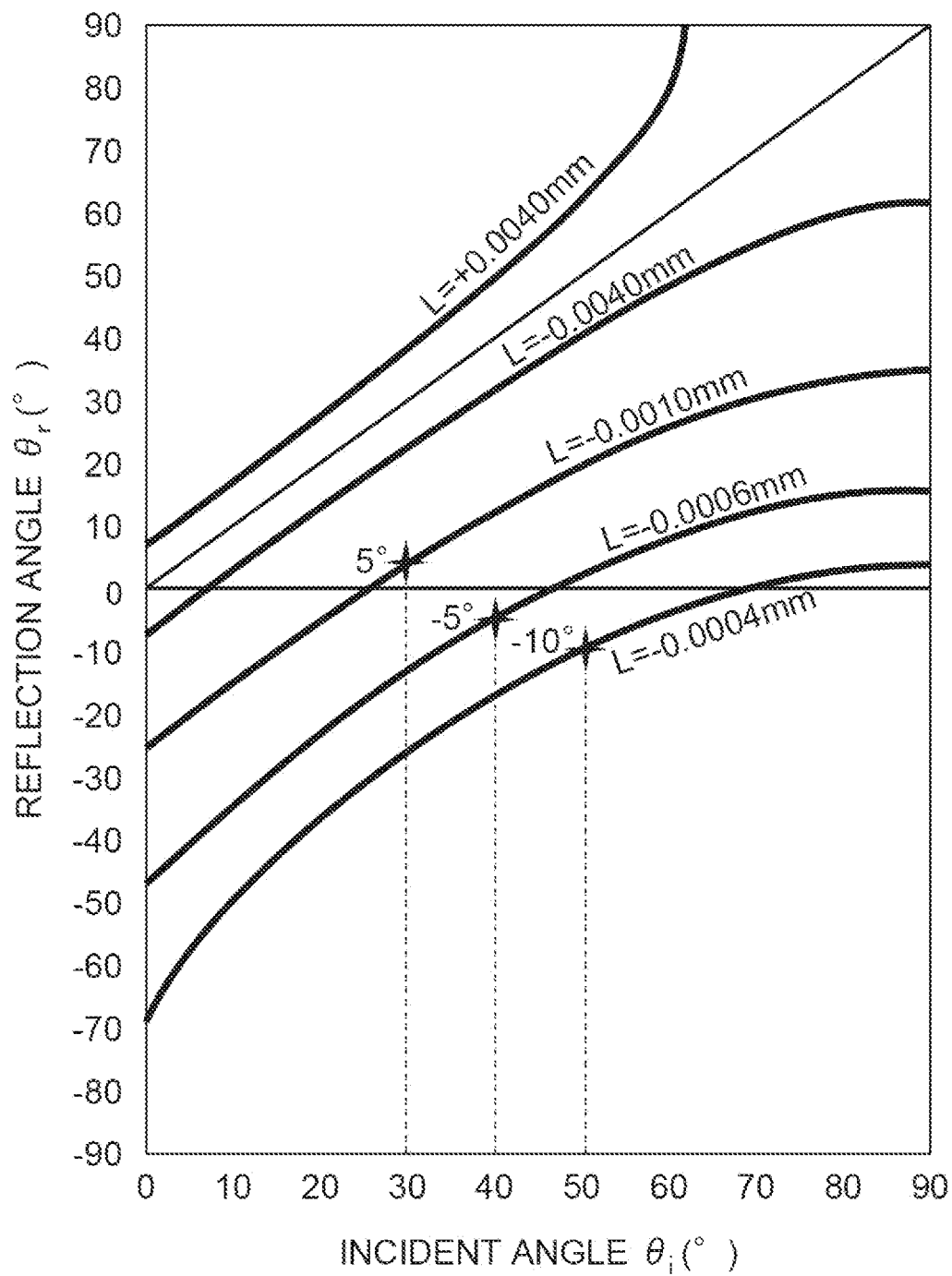
FIG. 8 is a diagram showing the relationship between the incident angle and the reflection angle for each length in the X-axis direction of the unit region with respect to the wavelength of blue.
Figure 9:
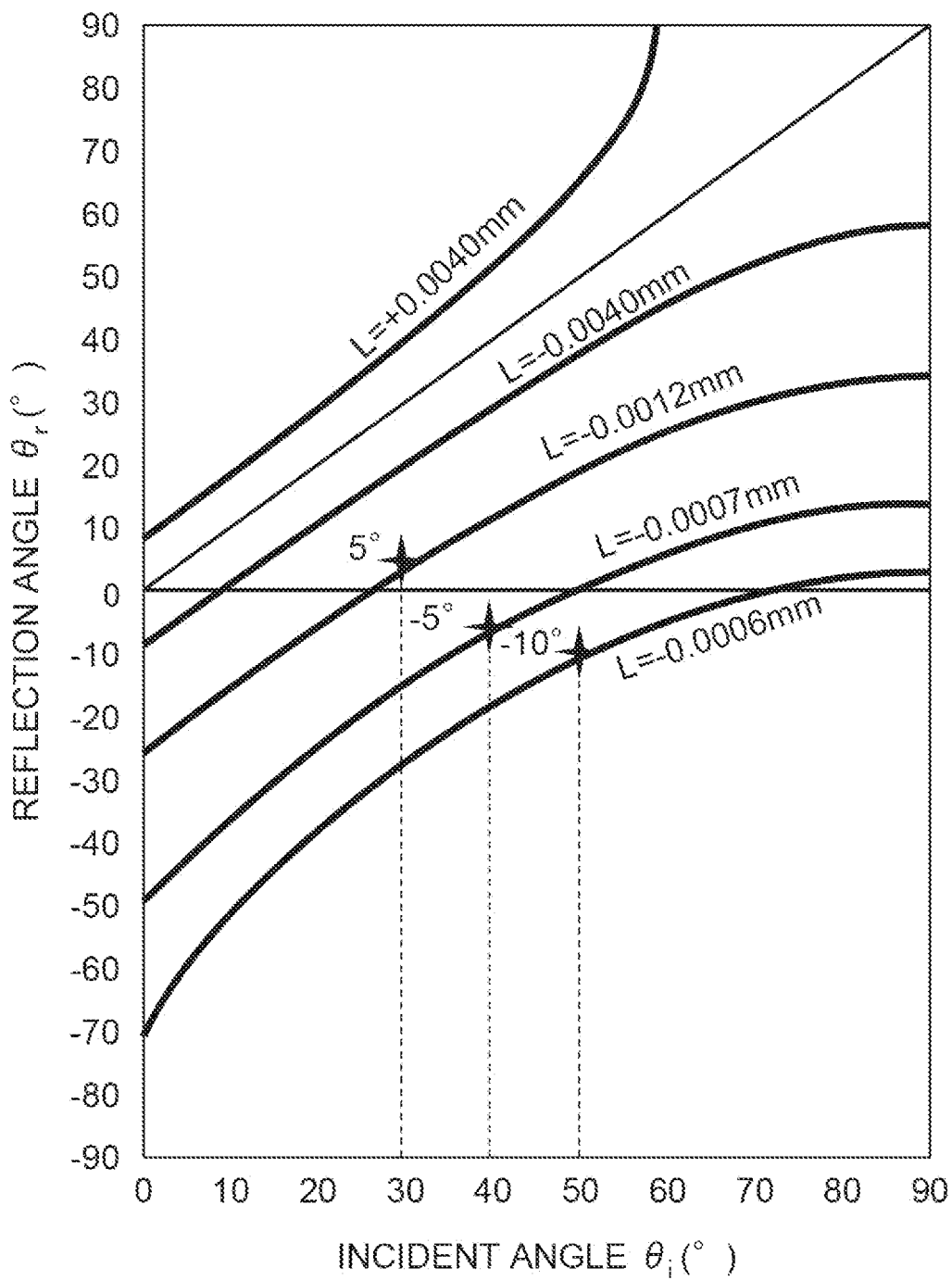
FIG. 9 is a diagram showing the relationship between the incident angle and the reflection angle for each length in the X-axis direction of the unit region with respect to the wavelength of green.
Figure 10:
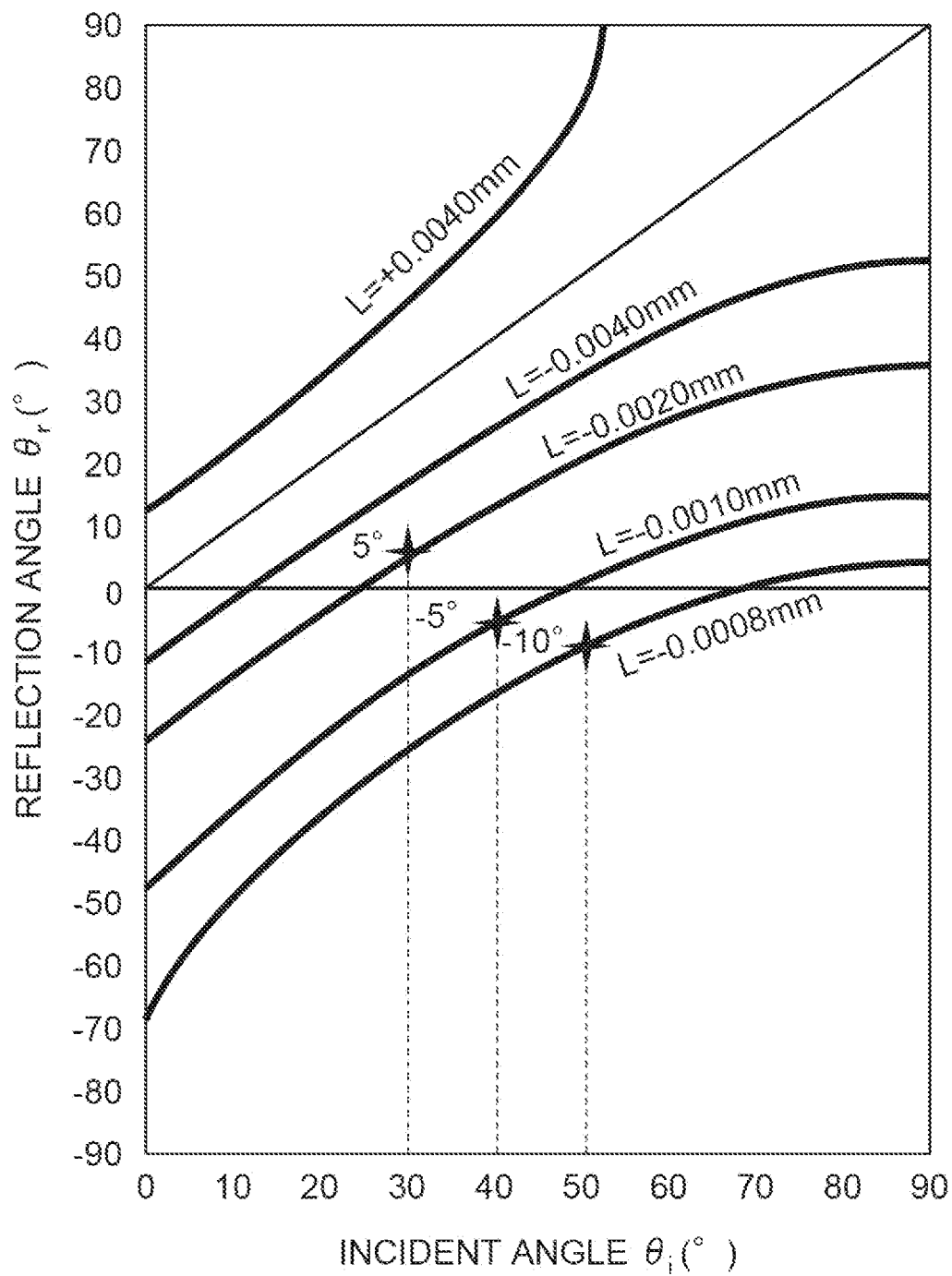
FIG. 10 is a diagram showing the relationship between the incident angle and the reflection angle for each length in the X-axis direction of the unit region with respect to the wavelength of red.
Figure 11:
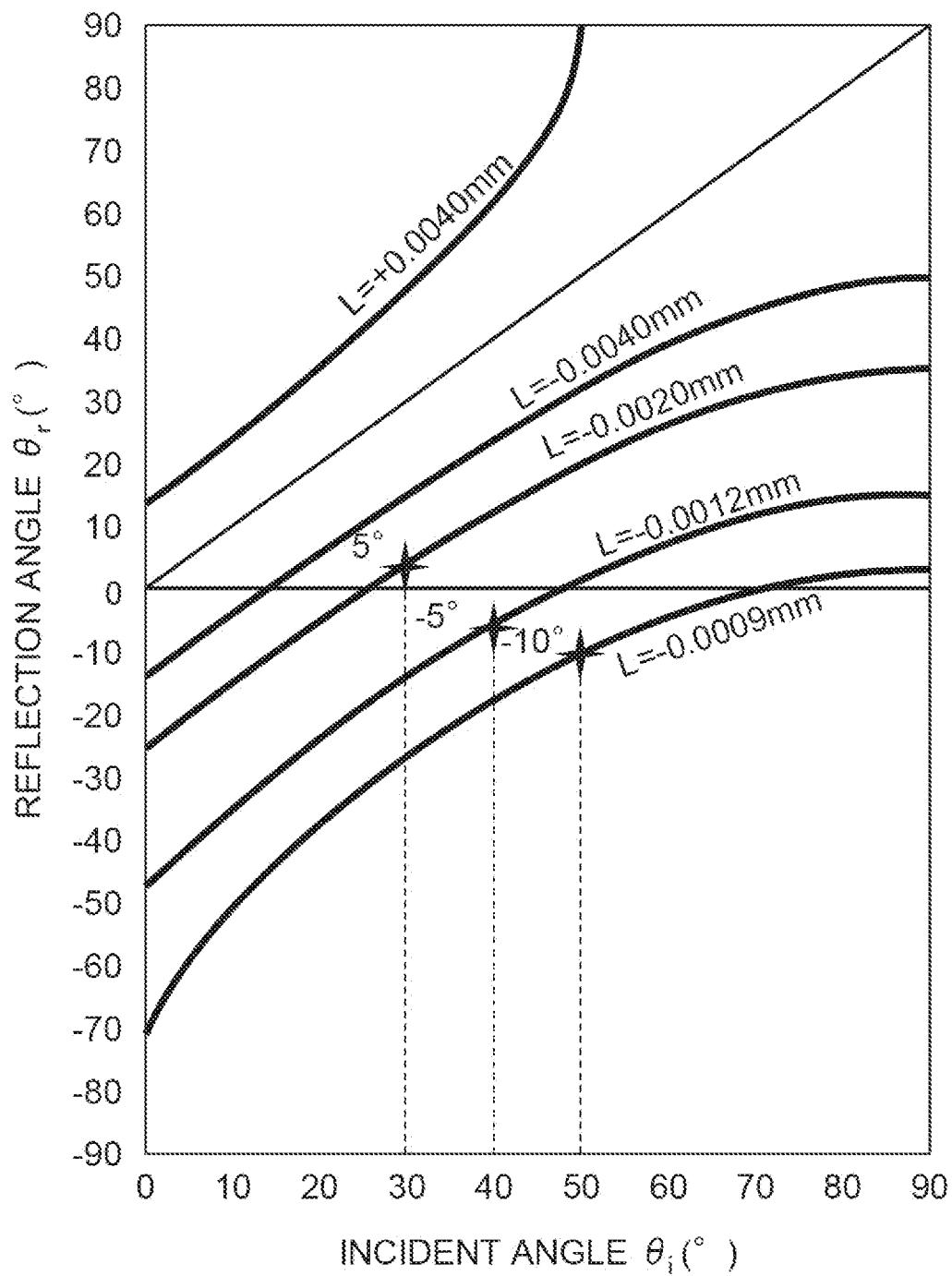
FIG. 11 is a diagram showing the relationship between the incident angle and the reflection angle for each length in the X-axis direction of the unit region with respect to the wavelength of near-infrared light.
Figure 12:
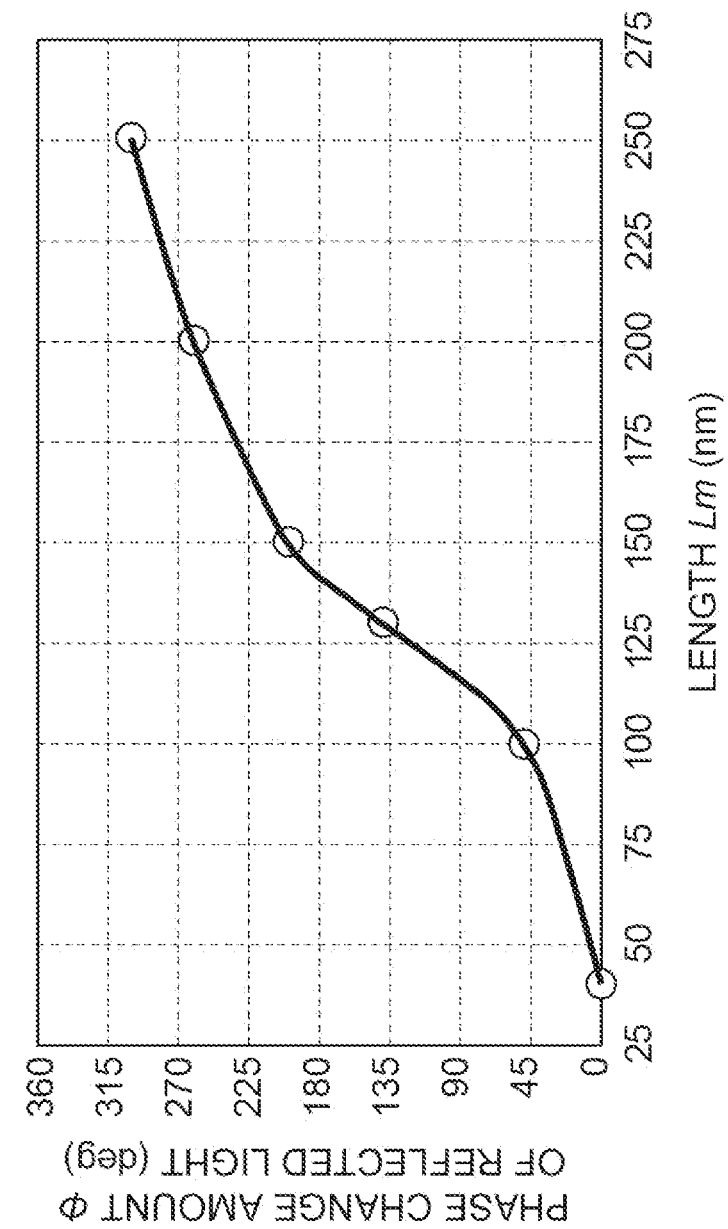
FIG. 12 is a diagram showing the relationship between the length of the metal body and the phase change amount of the reflected light.

Next, a method for determining the length Lx and the length Lm will be described with further reference to FIGS. 7 to 17. FIG. 7 is a diagram showing a phase change amount of the reflected light at a position in the X-axis direction of the unit region. FIG. 8 is a diagram showing the relationship between the incident angle and the reflection angle for each length in the X-axis direction of the unit region with respect to the wavelength of blue. FIG. 9 is a diagram showing the relationship between the incident angle and the reflection angle for each length in the X-axis direction of the unit region with respect to the wavelength of green. FIG. 10 is a diagram showing the relationship between the incident angle and the reflection angle for each length in the X-axis direction of the unit region with respect to the wavelength of red. FIG. 11 is a diagram showing the relationship between the incident angle and the reflection angle for each length in the X-axis direction of the unit region with respect to the wavelength of near-infrared light. FIG. 12 is a diagram showing the relationship between the length of the metal body and the phase change amount of the reflected light. FIGS. 13 to 17 are plan views schematically showing an example of the unit region shown in FIG. 4.

As described above, a reflective mirror is formed by the plurality of metal bodies 44. As shown in FIGS. 5 and 7, the lengths Lm of the plurality of metal bodies 44 are set so that the phase change amount $\varphi$ of the reflected light Lr by the metal bodies 44 increases or decreases linearly from one end 31a (first end) to the other end 31b (second end) in the X-axis direction of the unit region 31. The phase change amount $\varphi$ of the reflected light Lr is an amount by which the phase of the reflected light Lr from the phase of the reflected light Lr by a certain metal body 44 changes when the size of the metal body 44 is changed. In the present embodiment, two metal bodies 44 adjacent to each other in the X-axis direction constitute one set, and the lengths Lm of the two metal bodies 44 included in the same set are equal to each other. Since each set of metal bodies 44 reflects the laser light with a phase change amount $\varphi$ different from that of the other sets of metal bodies 44, a wave front is formed by interference between reflected lights. That is, a plane wave having the gradient of the function $\varphi(x)$ indicating the relationship between the position x in the X-axis direction and the phase change amount $\varphi$ as the wave vector $\Phi$ is generated.

Here, by generalizing the Snell's law, the Snell's law is expressed by Equation (1) using the wave vector $k_0$ of the laser light Ls, the incident angle $\theta_i$, the reflection angle $\theta_r$, and the wave vector $\Phi$.

[Equation 1]

$$k_0 \times \sin\theta_i + \Phi = k_0 \times \sin\theta_r \quad (1)$$

The wave vector $k_0$ is expressed by $2\pi/\lambda$ using the wavelength $\lambda$ of the laser light Ls. The wave vector $\Phi$ is expressed by $2\pi/Lx$ using the length Lx. By transforming Equation (1) using these relations, Equation (2) is obtained.

[Equation 2]

$$\theta_r = \sin^{-1}\left(\sin\theta_i + \frac{\Phi}{k_0}\right) = \sin^{-1}\left(\sin\theta_i + \frac{\lambda}{Lx}\right) \quad (2)$$

The length Lx of the unit region 31 is obtained by substituting the wavelength of the color component of the laser light Ls corresponding to the unit region 31 and the incident angle $\theta_i$ and the reflection angle $\theta_r$ of the laser light Ls corresponding to the position where the unit region 31 is provided into Equation (2).

For example, assuming that the wavelength $\lambda$ of the blue component contained in the laser light Ls is 430 nm, the relationship between the incident angle $\theta_i$ and the reflection angle $\theta_r$ at each length Lx shown in FIG. 8 is obtained from Equation (2). In the unit region 31 provided at the position Pfa, the laser light Ls is incident at an incident angle $\theta_i$ of 30°, and the laser light Ls is reflected at a reflection angle $\theta_r$ of 5° to be emitted as the reflected light Lr. Therefore, the length Lx of the unit region 31 for the blue component provided at the position Pfa is determined to be −0.0010 mm (=−1.0 µm). Here, the length Lx is represented by a positive value when the lengths Lm of the metal bodies 44 increase from one end 31*a* toward the other end 31*b*, and is represented by a negative value when the lengths Lm of the metal bodies 44 decrease from one end 31*a* toward the other end 31*b*.

Similarly, in the unit region 31 provided at the position Pfb, the laser light Ls is incident at an incident angle $\theta_i$ of 40°, and the laser light Ls is reflected at a reflection angle $\theta_r$ of −5° to be emitted as the reflected light Lr. Therefore, the length Lx of the unit region 31 for the blue component provided at the position Pfb is determined to be −0.0006 mm (=−0.6 µm). In the unit region 31 provided at the position Pfc, the laser light Ls is incident at an incident angle $\theta_i$ of 50°, and the laser light Ls is reflected at a reflection angle $\theta_r$ of −10° to be emitted as the reflected light Lr. Therefore, the length Lx of the unit region 31 for the blue component provided at the position Pfc is determined to be −0.0004 mm (=−0.4 µm).

Assuming that the wavelength $\lambda$ of the green component contained in the laser light Ls is 530 nm, the relationship between the incident angle $\theta_i$ and the reflection angle $\theta_r$ at each length Lx shown in FIG. 9 is obtained from Equation (2). In the unit region 31 provided at the position Pfa, the laser light Ls is incident at an incident angle $\theta_i$ of 30°, and the laser light Ls is reflected at a reflection angle $\theta_r$ of 5° to be emitted as the reflected light Lr. Therefore, the length Lx of the unit region 31 for the green component provided at the position Pfa is determined to be −0.0012 mm (=−1.2 µm). Similarly, the length Lx of the unit region 31 for the green component provided at the position Pfb is determined to be −0.0007 mm (=−0.7 µm). The length Lx of the unit region 31 for the green component provided at the position Pfc is determined to be −0.0006 mm (=−0.6 µm).

Assuming that the wavelength $\lambda$ of the red component contained in the laser light Ls is 750 nm, the relationship between the incident angle $\theta_i$ and the reflection angle $\theta_r$ at each length Lx shown in FIG. 10 is obtained from Equation (2). Therefore, the length Lx of the unit region 31 for the red component provided at the position Pfa is determined to be −0.0020 mm (=−2.0 µm). The length Lx of the unit region 31 for the red component provided at the position Pfb is determined to be −0.0010 mm (=−1.0 µm). The length Lx of the unit region 31 for the red component provided at the position Pfc is determined to be −0.0008 mm (=−0.8 µm).

Assuming that the wavelength 2 of the near-infrared component contained in the laser light Ls is 850 nm, the relationship between the incident angle $\theta_i$ and the reflection angle $\theta_r$ at each length Lx shown in FIG. 11 is obtained from Equation (2). The length Lx of the unit region 31 for the near-infrared component provided at the position Pfa is determined to be −0.0020 mm (=−2.0 µm). The length Lx of the unit region 31 for the near-infrared component provided at the position Pfb is determined to be −0.0012 mm (=−1.2 µm). The length Lx of the unit region 31 for the near-infrared component provided at the position Pfc is determined to be −0.0009 mm (=−0.9 µm).

Subsequently, the length Lm of each metal body 44 included in the unit region 31 is determined. In one unit region 31, the condition that the phase change amount $\varphi$ changes linearly from one end 31*a* to the other end 31*b* and that the phase change amount $\varphi$ changes by 360° ($2\pi$ radians) from one end 31*a* to the other end 31*b* must be satisfied. Therefore, when the length Lx is a positive value, the lengths Lm of the metal bodies 44 are determined so that the above-described condition is satisfied and the lengths Lm increase from one end 31*a* toward the other end 31*b*. When the length Lx is a negative value, the lengths Lm of the metal bodies 44 are determined so that the above-described condition is satisfied and the lengths Lm decrease from one end 31*a* toward the other end 31*b*.

For example, the relationship between the length Lm and the phase change amount $\varphi$ is obtained in advance by calculation, experiment, or the like using the width Wm set to a fixed value. When the width Wm is 100 nm, the relationship shown in FIG. 12 is obtained. Specifically, when gold (Au) is used as the constituent material of the metal layer 41 and the metal body 44, silicon dioxide ($SiO_2$) is used as the constituent material of the dielectric layer 42, the thickness d1 is 200 nm, the thickness d2 is 50 nm, the thickness d3 is 40 nm, and the width Wm is 100 nm, the relationship shown in FIG. 11 is obtained by obtaining the phase change amount $\varphi$ of the single metal body 44 having each length Lm.

For example, in the metal body 44 having a length Lm of 40 nm (hereinafter referred to as a "metal body 44A"), the phase change amount $\varphi$ is 0°. In the metal body 44 having a length Lm of 100 nm (hereinafter referred to as a "metal body 44B"), the phase change amount $\varphi$ is 50°. In the metal body 44 having a length Lm of 130 nm (hereinafter referred to as a "metal body 44C"), the phase change amount $\varphi$ is 140°. In the metal body 44 having a length Lm of 150 nm (hereinafter referred to as a "metal body 44D"), the phase change amount $\varphi$ is 200°. In the metal body 44 having a length Lm of 250 nm (hereinafter referred to as a "metal body 44E"), the phase change amount $\varphi$ is 300°.

The number and lengths Lm of the metal bodies 44 included in the unit region 31 may be determined by selecting some metal bodies 44 from the above-described metal bodies 44 in accordance with the length Lx and arranging the selected metal bodies 44 in the X-axis direction so as to satisfy the above-described condition. A plurality of sets of two metal bodies 44 having the same length Lm may be arranged in the X-axis direction. For example, as shown in FIG. 7, when the length Lx is 1200 nm, the metal body 44A, the metal body 44A, the metal body 44B, the metal body 44B, the metal body 44C, the metal body 44C, the metal body 44D, the metal body 44D, the metal body 44E, and the metal body 44E are arranged in this order from one end 31a to the other end 31b at intervals Ds of 20 nm in the X-axis direction.

Figure 13:
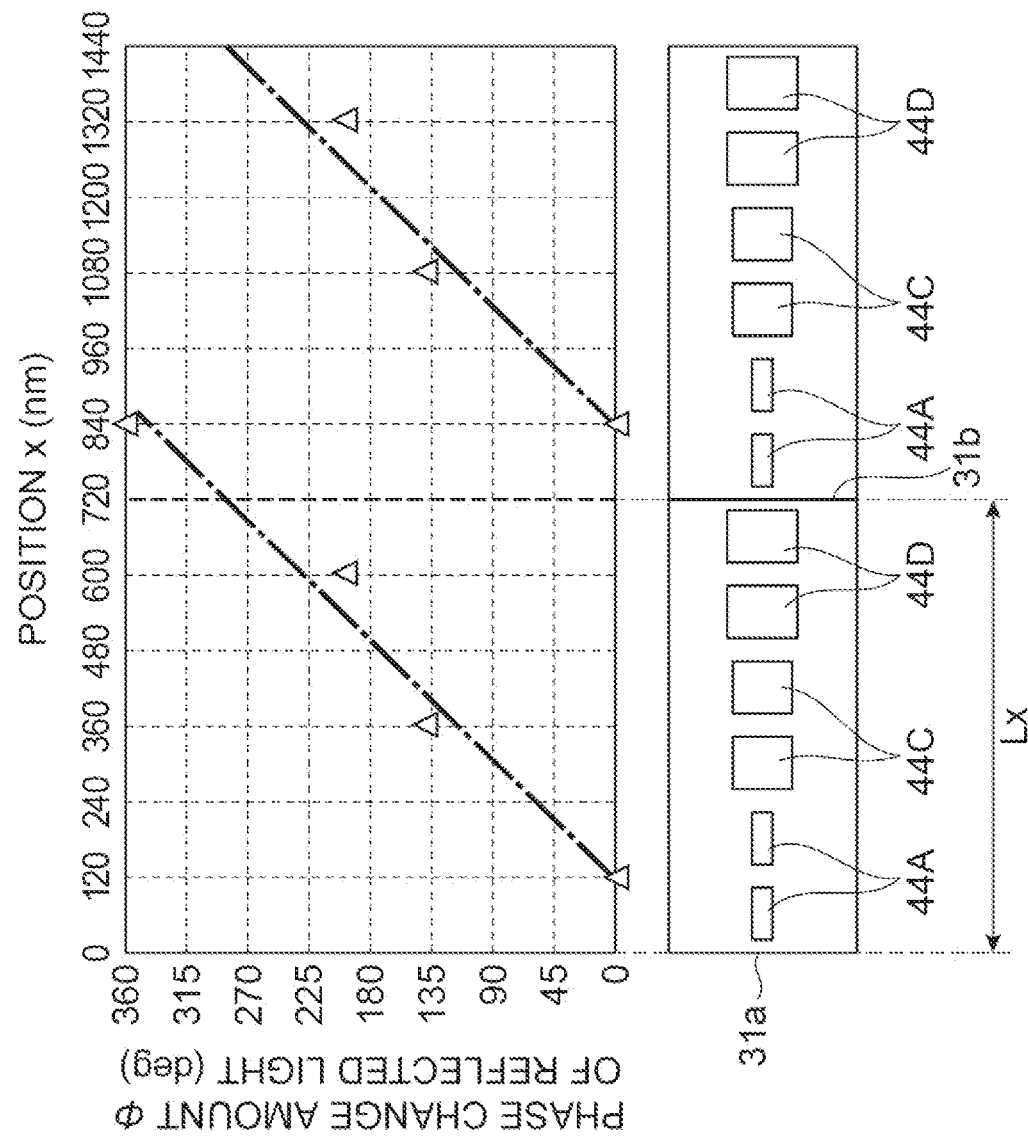
FIG. 13 is a plan view schematically showing another example of the unit region shown in FIG. 4.
Figure 14:
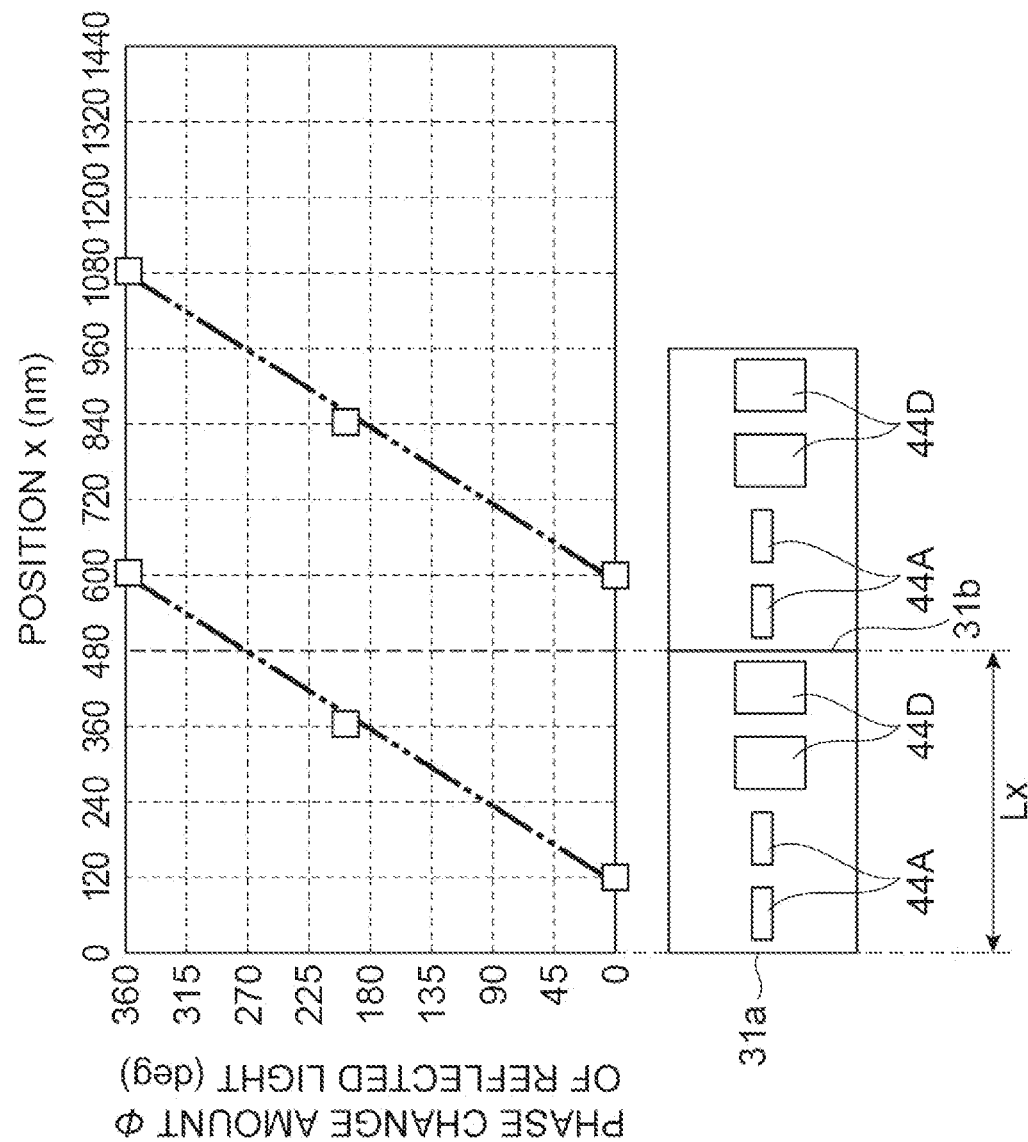
FIG. 14 is a plan view schematically showing yet another example of the unit region shown in FIG. 4.

As shown in FIG. 13, when the length Lx is 720 nm, the metal body 44A, the metal body 44A, the metal body 44C, the metal body 44C, the metal body 44D, and the metal body 44D are arranged in this order from one end 31a to the other end 31b at intervals Ds of 20 nm in the X-axis direction. As shown in FIG. 14, when the length Lx is 480 nm, the metal body 44A, the metal body 44A, the metal body 44D, and the metal body 44D are arranged in this order from one end 31a to the other end 31b at intervals Ds of 20 nm in the X-axis direction.

Figure 15:
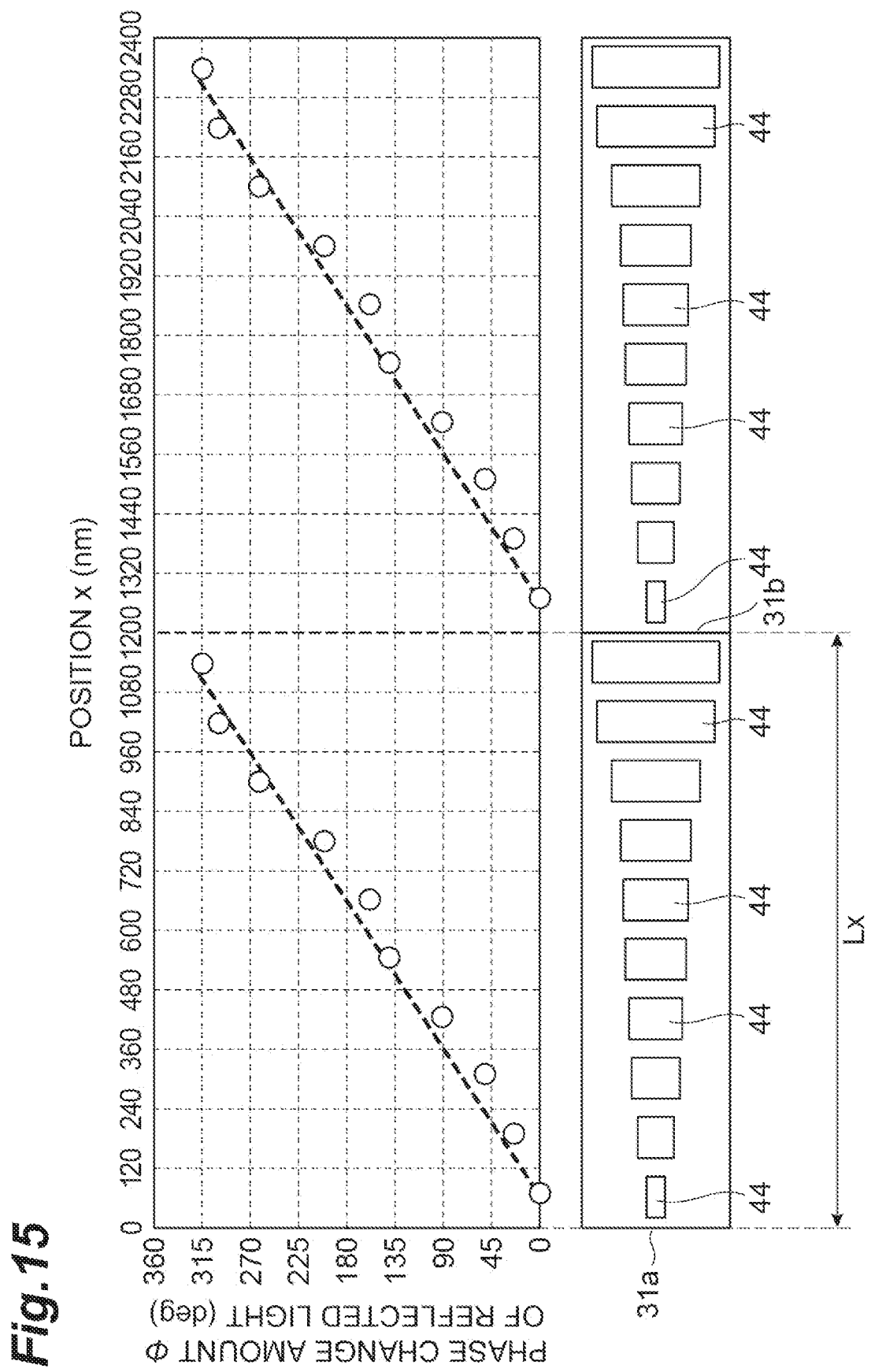
FIG. 15 is a plan view schematically showing yet another example of the unit region shown in FIG. 4.

Instead of a configuration in which sets of two metal bodies 44 having the same length Lm are arranged in the X-axis direction, metal bodies 44 having different lengths Lm may be arranged one by one in the X-axis direction. For example, as shown in FIG. 15, when the length Lx is 1200 nm, a metal body 44 having a length Lm of 40 nm, a metal body 44 having a length Lm of 75 nm, a metal body 44 having a length Lm of 100 nm, a metal body 44 having a length Lm of 112 nm, a metal body 44 having a length Lm of 130 nm, a metal body 44 having a length Lm of 137 nm, a metal body 44 having a length Lm of 150 nm, a metal body 44 having a length Lm of 200 nm, a metal body 44 having a length Lm of 250 nm, and a metal body 44 having a length Lm of 263 nm are arranged in this order from one end 31a to the other end 31b at intervals Ds of 20 nm in the X-axis direction.

Figure 16:
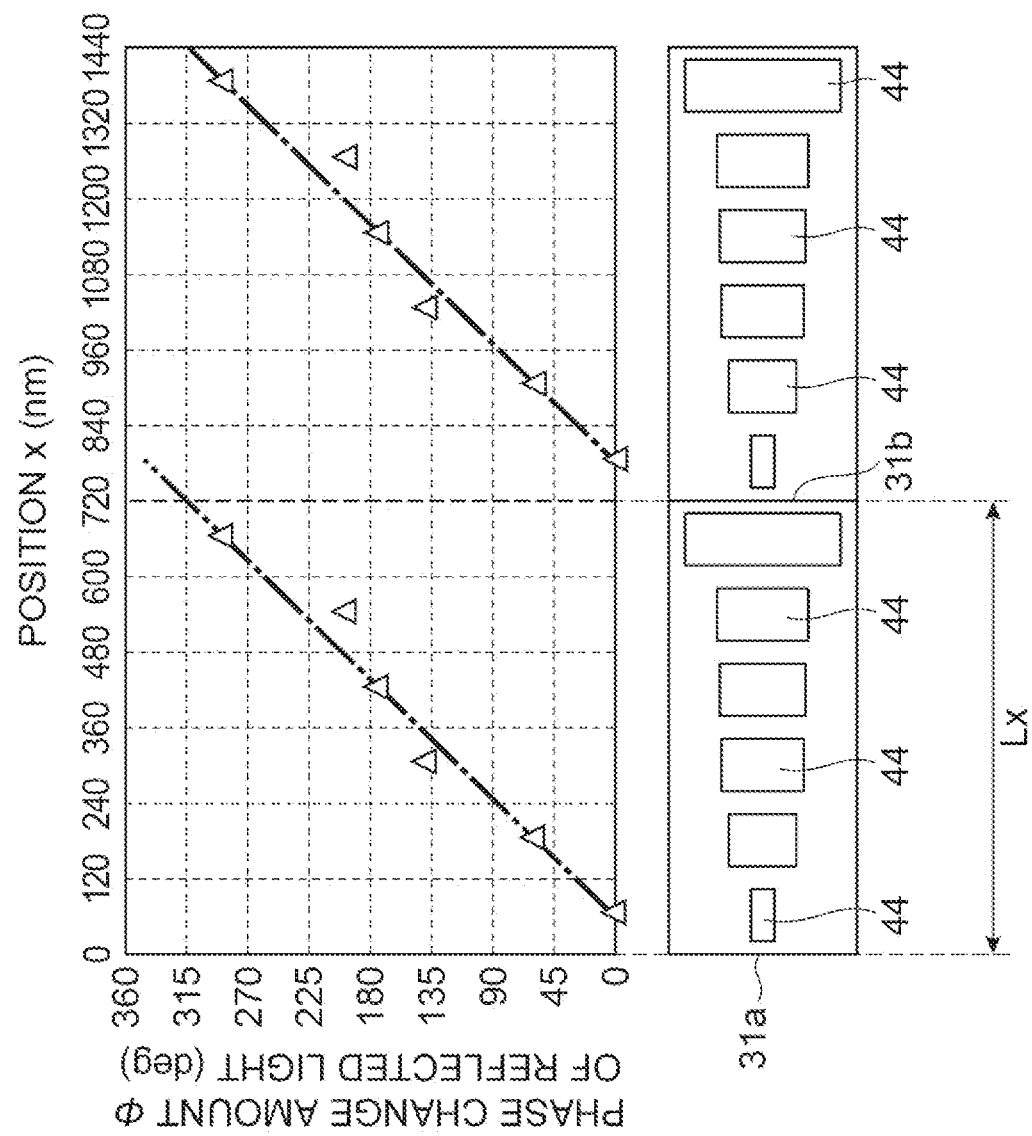
FIG. 16 is a plan view schematically showing yet another example of the unit region shown in FIG. 4.
Figure 17:
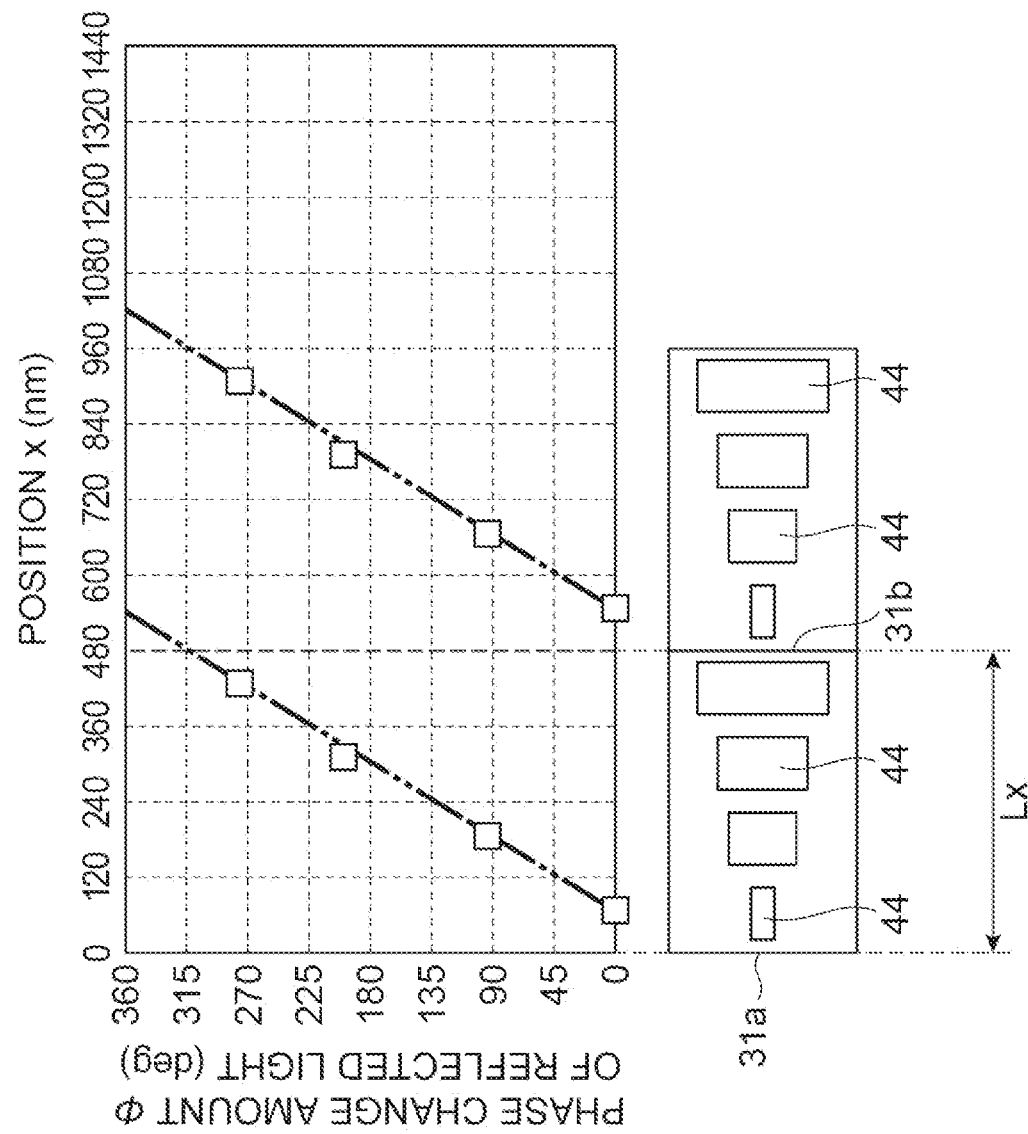
FIG. 17 is a plan view schematically showing yet another example of the unit region shown in FIG. 4.

As shown in FIG. 16, when the length Lx is 720 nm, a metal body 44 having a length Lm of 40 nm, a metal body 44 having a length Lm of 110 nm, a metal body 44 having a length Lm of 130 nm, a metal body 44 having a length Lm of 140 nm, a metal body 44 having a length Lm of 150 nm, and a metal body 44 having a length Lm of 250 nm are arranged in this order from one end 31a to the other end 31b at intervals Ds of 20 nm in the X-axis direction. As shown in FIG. 17, when the length Lx is 480 nm, a metal body 44 having a length Lm of 40 nm, a metal body 44 having a length Lm of 118 nm, a metal body 44 having a length Lm of 150 nm, and a metal body 44 having a length Lm of 215 nm are arranged in this order from one end 31a to the other end 31b at intervals Ds of 20 nm in the X-axis direction.

As described above, by arranging the metal bodies 44 having different lengths Lm one by one in the X-axis direction, the function $\varphi(x)$ approaches a straight line, so that the wave front of the reflected light approaches a plane.

The combination of the incident angle $\theta_i$ and the reflection angle $\theta_r$ is determined in accordance with the position in the X-axis direction and the position in the Y-axis direction. Although the structures of the unit regions 31 provided at different positions in the X-axis direction have been described in the above-described example, each of the unit regions 31 provided at different positions in the Y-axis direction also has a structure capable of realizing a combination of the incident angle $\theta_i$ and the reflection angle $\theta_r$ corresponding to the position.

Figure 18:
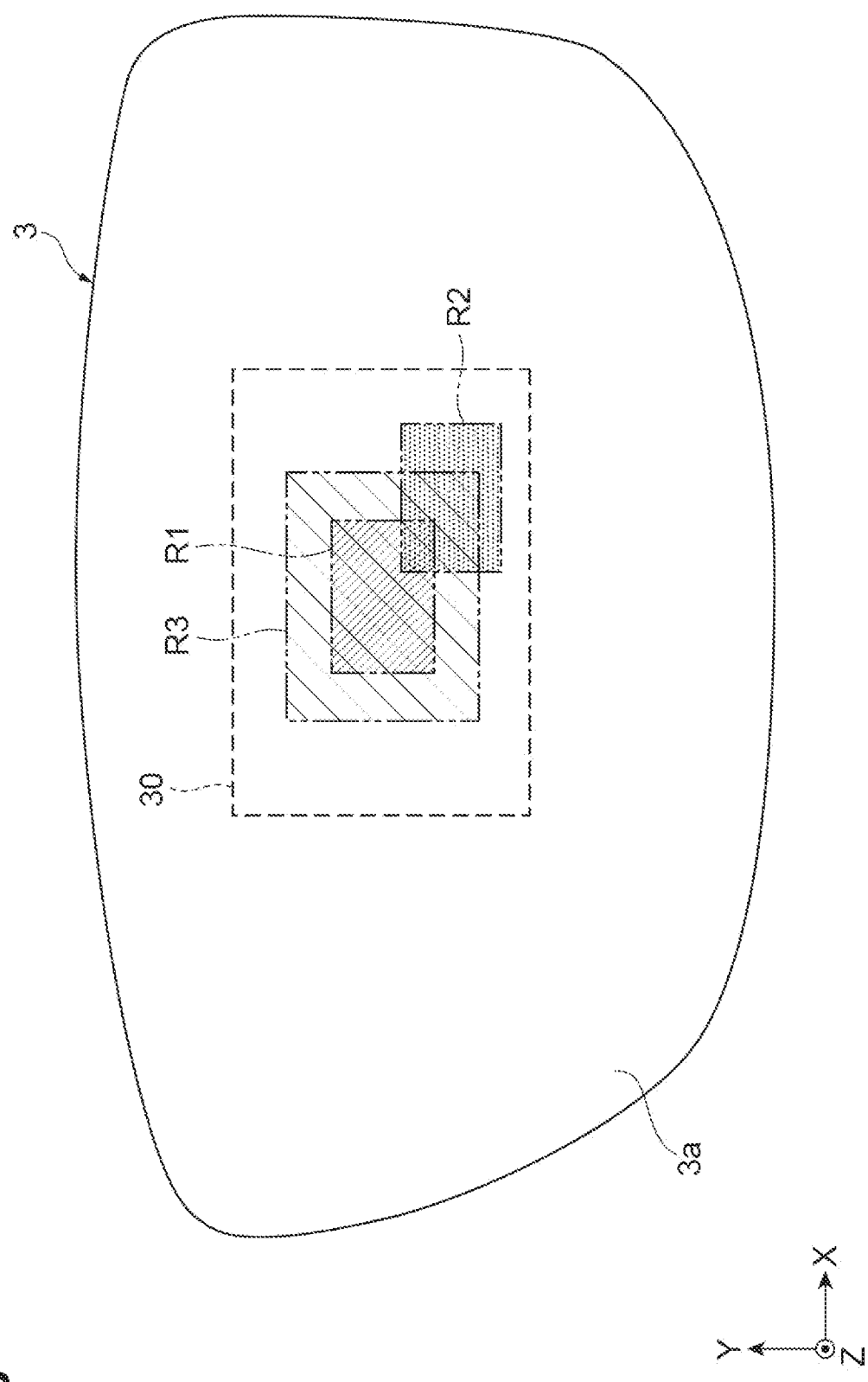
FIG. 18 is a diagram for explaining an example of a method for determining the irradiation range in accordance with the position of the pupil.

Next, the operation of the retinal projection device 10 will be described with reference to FIGS. 2, 3 and 18. FIG. 18 is a diagram for explaining an example of a method for determining the irradiation range in accordance with the position of the pupil. When the retinal projection device 10 is activated, the position of the pupil PP is first detected. As shown in FIGS. 2 and 3, the controller 26 controls the laser driver 24 to cause the light source unit 21 to emit a laser light for detecting the position of the pupil PP, and controls the mirror driver 25 to swing the movable mirror 23 so as to scan the entire reflector 30 with the laser light Ls. Accordingly, the laser light is emitted from the light source unit 21, and then passes through the optical components 22 to be reflected by the movable mirror 23. The laser light reflected by the movable mirror 23 is emitted to the reflector 30 as the laser light Ls. Then, the laser light Ls is reflected by the reflector 30 to be applied to the eyeball E as the reflected light Lr.

The laser light Ls (reflected light Lr) contains the near-infrared component for eye-tracking, and the near-infrared component is reflected by the eyeball E. When the reflected light Lr is applied to a portion of the eyeball E other than the pupil PP, the reflected light Lr is reflected by the surface of the eyeball E and returns to the optical engine 20 through the same optical path as the outward path. On the other hand, when the reflected light Lr is applied to the pupil PP, the reflected light Lr passes through the pupil PP to be reflected by the retina RE, and returns to the optical engine 20 through the same optical path as the outward path. The controller 26 measures the reflection time (Time of Flight) of laser light (near-infrared component) and detects the position of the pupil PP based on the reflection time. The reflection time is a time from when the laser light (near-infrared component) is emitted from the light source unit 21 to when the laser light returns to the optical engine 20 (light source unit 21).

Although the optical path length from the light source unit 21 to the eyeball E differs in accordance with the irradiation position on the reflector 30, the optical path length continuously changes while the surface of the eyeball E is irradiated with the reflected light Lr during scanning of the reflector 30. When laser light is applied to the pupil PP, the laser light is reflected not by the surface of the eyeball E but by the retina RE, so that the optical path length becomes longer by twice the diameter of the eyeball E. Therefore, for example, when the absolute value of the amount of change obtained by subtracting the reflection time at the previous irradiation position from the reflection time at a certain irradiation position exceeds a predetermined threshold value, the controller 26 determines that the peripheral edge of the pupil PP exists between the two irradiation positions. When the amount of change is a positive value, the controller 26 determines that the current irradiation position is included in the pupil PP. When the amount of change is a negative value, the controller 26 determines that the current irradiation position is outside the pupil PP.

When the absolute value of the amount of change is equal to or less than the threshold value, the controller 26 determines that there is no peripheral edge of the pupil PP between the two irradiation positions. In this manner, the controller 26 detects the position (peripheral edge) of the pupil PP. Then, the controller 26 determines the irradiation range of the laser light Ls from the reflector 30 in accordance with the position of the pupil PP.

Subsequently, the controller 26 controls the laser driver 24 so as to cause the light source unit 21 to emit a laser light having a color and intensity corresponding to a pixel of an image to be projected onto the retina RE, and controls the movable mirror 23 so as to irradiate the irradiation range of the reflector 30 with the laser beam Ls. For example, it is assumed that the pupil PP faces the front and the irradiation range R1 (first irradiation range) is used. As a result, a laser light having a color and intensity corresponding to a pixel of an image to be projected onto the retina RE is emitted from the light source unit 21, and passed through the optical components 22 to be reflected by the movable mirror 23. The laser light reflected by the movable mirror 23 is emitted to the reflector 30 as the laser light Ls. Then, the laser light Ls is reflected by the reflector 30, and is applied to the retina RE as the reflected light Lr.

While the laser light is emitted, the controller 26 measures the reflection time of the near-infrared component. When the reflected light Lr is applied to a position outside the pupil PP in the eyeball E, the reflection time is shorter than that when the reflected light Lr is applied to the pupil PP. Therefore, for example, the controller 26 determines that the reflected light Lr has deviated from the pupil PP when the amount of change obtained by subtracting the reflection time at a certain irradiation position from the reflection time at the irradiation position immediately before the certain irradiation position exceeds a predetermined threshold value, and determines that the reflected light Lr has not deviated from the pupil PP when the amount of change is equal to or less than the threshold value. When it is determined that the reflected light Lr has not deviated from the pupil PP, the controller 26 maintains the irradiation range of the laser light Ls at the irradiation range R1.

On the other hand, when it is determined that the laser light has deviated from the pupil PP, the controller 26 detects the position of the pupil PP in the same manner as when the retinal projection device 10 is activated. Then, the controller 26 determines the irradiation range of the laser light Ls from the reflector 30 in accordance with the position of the pupil PP. Here, it is assumed that the controller 26 changes the irradiation range of the laser light Ls from the irradiation range R1 to the irradiation range R2 (second irradiation range). The irradiation range R2 partially overlaps the irradiation range R1. At this time, the controller 26 controls the mirror driver 25 to adjust the swing range of the movable mirror 23 so that the laser light Ls can be applied to the irradiation range R2.

Then, the controller 26 controls the mirror driver 25 to swing the movable mirror 23 so as to scan the irradiation range R2 with the laser light Ls. The controller 26 repeats the above-described processing while projecting the image.

The controller 26 may expand or reduce the irradiation range of the laser light Ls. For example, an expansion command is output to the controller 26 in response to the user performing an operation for expanding the irradiation range. The controller 26 expands the irradiation range of the laser light Ls in response to receiving the expansion command. For example, the controller 26 changes the irradiation range of the laser light Ls from the irradiation range R1 to the irradiation range R3. Similarly, a reduction command is output to the controller 26 in response to the user performing an operation for reducing the irradiation range. The controller 26 reduces the irradiation range of the laser light Ls in response to receiving the reduction command. The irradiation range of the laser light Ls may be expanded or reduced in accordance with the content of the image. The irradiation range of the laser light Ls may be expanded or reduced in accordance with the resolution of the image.

Next, a method of manufacturing the near eye wearable device 1 will be described. First, the lens 3 is prepared and set in a vacuum film deposition device. Then, the metal layer 41 is formed in a desired area on the inner surface 3a of the lens 3. Specifically, the metal layer 41 is formed by vacuum film deposition using a technique such as a direct current (DC) sputtering. For forming the metal layer 41, a metal material composed of any metal selected from a group consisting of gold (Au), copper (Cu), silver (Ag), iridium (Ir), ruthenium (Ru), rhodium (Rh), titanium (Ti), tantalum (Ta), tungsten (W), cobalt (Co), iron (Fe), and nickel (Ni) or a metal alloy containing at least one element selected from the above-described group is used. The metal layer 41 is formed with a film thickness of, for example, 1 nm to 1000 nm. When gold is used as the metal material, the thickness of the metal layer 41 is, for example, 200 nm.

Subsequently, the dielectric layer 42 is formed on the metal layer 41. Specifically, the dielectric layer 42 is formed by vacuum film deposition using a technique such as a radio frequency (RF) sputtering. For forming the dielectric layer 42, a dielectric material such as silicon dioxide ($SiO_2$), titanium oxide ($TiO_2$), magnesium oxide (MgO) or aluminum oxide ($Al_2O_3$) which can be formed by a semiconductor process is used. The dielectric layer 42 is formed with a film thickness of, for example, 1 nm to 1000 nm. When silicon dioxide is used as the dielectric material, the thickness of the dielectric layer 42 is, for example, 40 nm.

Subsequently, a metal layer (hereinafter referred to as an "outermost metal layer") which is a base of the metal layer 43 is formed on the dielectric layer 42. Since the method of forming the outermost metal layer is the same as that of the metal layer 41, a detailed description thereof will be omitted. The outermost metal layer is formed with a film thickness of, for example, 1 nm to 1000 nm. When gold is used as the metal material, the thickness of the outermost metal layer is, for example, 50 nm.

Subsequently, the metal layer 43 (plurality of metal bodies 44) is formed by a photolithography process and an etching process. Specifically, a liquid resist is applied onto the outermost metal layer using a spin coater or the like, and the applied liquid resist is dried to form a resist film (photoresist). Then, a pattern corresponding to the metal bodies 44 is transferred onto the resist film using an exposure device such as a KrF exposure device and an electron beam lithography device. Then, the pattern transferred to the resist film is developed using a developing machine. Then, a portion of the outermost metal layer not covered with the pattern is removed by ion milling, and then the resist film is removed. Thus, the metal layer 43 is formed. The width Wm and the length Lm of each metal body 44 are, for example, 10 nm to 1000 nm. As described above, the reflector 30 is formed on the inner surface 3a of the lens 3.

Subsequently, the frame 2 on which the optical engine 20 is mounted is prepared, and the lens 3 on which the reflector 30 is formed is mounted on the rim 2a of the frame 2. As described above, the near eye wearable device 1 is manufactured.

The reflector 30 (laminate 40) may not be directly formed on the inner surface 3a of the lens 3. For example, the reflector 30 may be formed on a base material such as a sapphire substrate or a flexible sheet. The method of forming the reflector 30 on the base material is the same as the method of forming the reflector 30 on the lens 3. In this case, a plurality of reflectors 30 may be formed on the base material. Then, by cutting the base material, a portion including one reflector 30 is obtained. The reflector 30 is formed on the inner surface 3a of the lens 3 by attaching the portion of the base material to a predetermined area of the inner surface 3a of the lens 3.

In the near eye wearable device 1 and the retinal projection device 10 described above, the plurality of unit regions 31 is provided along the inner surface 3a of the lens 3, a part of the unit regions 31 is determined as the irradiation range in accordance with the position of the pupil PP of the user, and the projector module 27 is controlled so that the laser light Ls is applied to the irradiation range. Therefore, even if the user moves the eyes of the user, the reflected light Lr can be applied to the retina RE of the user, so that the user can correctly recognize the image. As described above, the eye box can be expanded.

The controller 26 determines the irradiation range R1 as the irradiation range when the pupil PP faces the front (when the pupil PP is located at a first position), and determines the irradiation range R2 as the irradiation range when the pupil PP is located at a second position different from the first position. The irradiation range R1 and the irradiation range R2 partially overlap each other. In this case, the unit regions 31 included in the portion where the irradiation range R1 and the irradiation range R2 overlap can be used for both the irradiation range R1 and the irradiation range R2. Since the degree of freedom in setting the irradiation range can be increased, it is possible to set the irradiation range more suitable for the position of the pupil PP.

The laser light Ls contains the red component, the green component, and the blue component for projecting an image onto the retina RE, and the near-infrared component for detecting the position of the pupil PP. As shown in equation (2), the reflection angle $\theta_r$ when the laser light Ls is applied to the unit region 31 varies in accordance with the wavelength of the laser light Ls. On the other hand, in the retinal projection device 10, since the unit region 31 is provided for each of the different wavelength components contained in the laser light Ls, the laser light Ls can be reflected at a desired reflection angle $\theta_r$. Further, since it is not necessary to provide another light source for detecting the position of the pupil PP, the size of the retinal projection device 10 can be reduced.

In the retinal projection (retinal drawing), since no image is displayed on the reflector 30, the user does not need to focus the user's eyes on the reflector 30 on the lens 3. Further, in the near eye wearable device 1 and the retinal projection device 10, each unit region 31 constituting the reflector 30 is a nanostructure. Therefore, even if the area where the reflector 30 is provided on the lens 3 is widened, the possibility that the user's field of view is limited can be reduced.

In each unit region 31, the metal layer 43 is provided above the metal layer 41 via the dielectric layer 42 in the Z-axis direction, and the plurality of metal bodies 44 is arranged in the X-axis direction in the metal layer 43. Therefore, each unit region 31 can function as a reflective mirror. Therefore, the reflection angle $\theta_r$ in the unit region 31 can be controlled by adjusting the size of each metal body 44.

Specifically, the size of each metal body 44 is set so that the phase change amount φ of the reflected light Lr increases or decreases linearly from one end 31a to the other end 31b of the unit region 31. Therefore, a plane wave having the gradient of the function φ(x) indicating the relationship between the position x in the X-axis direction and the phase change amount φ of the reflected light Lr as the wave vector Φ is generated. In this case, since Equations (1) and (2) are satisfied, the reflection angle $\theta_r$ can be adjusted by the length Lx of the unit region 31.

The controller 26 irradiates the irradiation range of the laser light Ls with the laser light Ls by adjusting the swing range of the movable mirror 23. According to this configuration, since a mechanism for moving the projector module 27 is not required, the size of the retinal projection device 10 can be reduced.

The retinal projection device and the near eye wearable device according to the present disclosure are not limited to the above-described embodiments.

In the above-described embodiments, the phase change amount φ is adjusted by fixing the width Wm of each metal body 44 and changing the length Lm of each metal body 44, but the phase change amount φ may be adjusted by changing both the width Wm and the length Lm. For example, the parameters other than the width Wm and the length Lm are set to values common to all the metal bodies 44, and the relationship between the phase change amount φ and the combination of the width Wm and the length Lm is obtained in advance by calculation or experiment in the same manner as the relationship shown in FIG. 12. Then, the width Wm and the length Lm of each metal body 44 included in the unit region 31 are determined so as to satisfy the condition that the phase change amount φ changes linearly from one end 31a to the other end 31b and that the phase change amount φ changes by 360° (2π radians) from one end 31a to the other end 31b.

For example, in the case of obtaining a phase change amount changing linearly by 360° with five metal bodies 44, a metal body 44 having a width Wm of 100 nm and a length Lm of 100 nm, a metal body 44 having a width Wm of 250 nm and a length Lm of 250 nm, a metal body 44 having a width Wm of 300 nm and a length Lm of 300 nm, a metal body 44 having a width Wm of 350 nm and a length Lm of 350 nm, and a metal body 44 having a width Wm of 400 nm and a length Lm of 400 nm may be arranged in this order in the X-axis direction.

Each unit region 31 may not be the laminate 40 (nanostructure) as long as the unit region 31 is configured to reflect the laser light Ls at the reflection angle $\theta_r$ corresponding to the position where the unit region 31 is provided when the laser light Ls is incident thereon.

The retinal projection device 10 may include a light source for eye-tracking provided separately from the light source unit 21. In this case, the light source unit 21 may emit a laser light not containing the near-infrared component, and the plurality of unit regions 31 may not include the unit region 31 for the near-infrared component.

Figure 19:
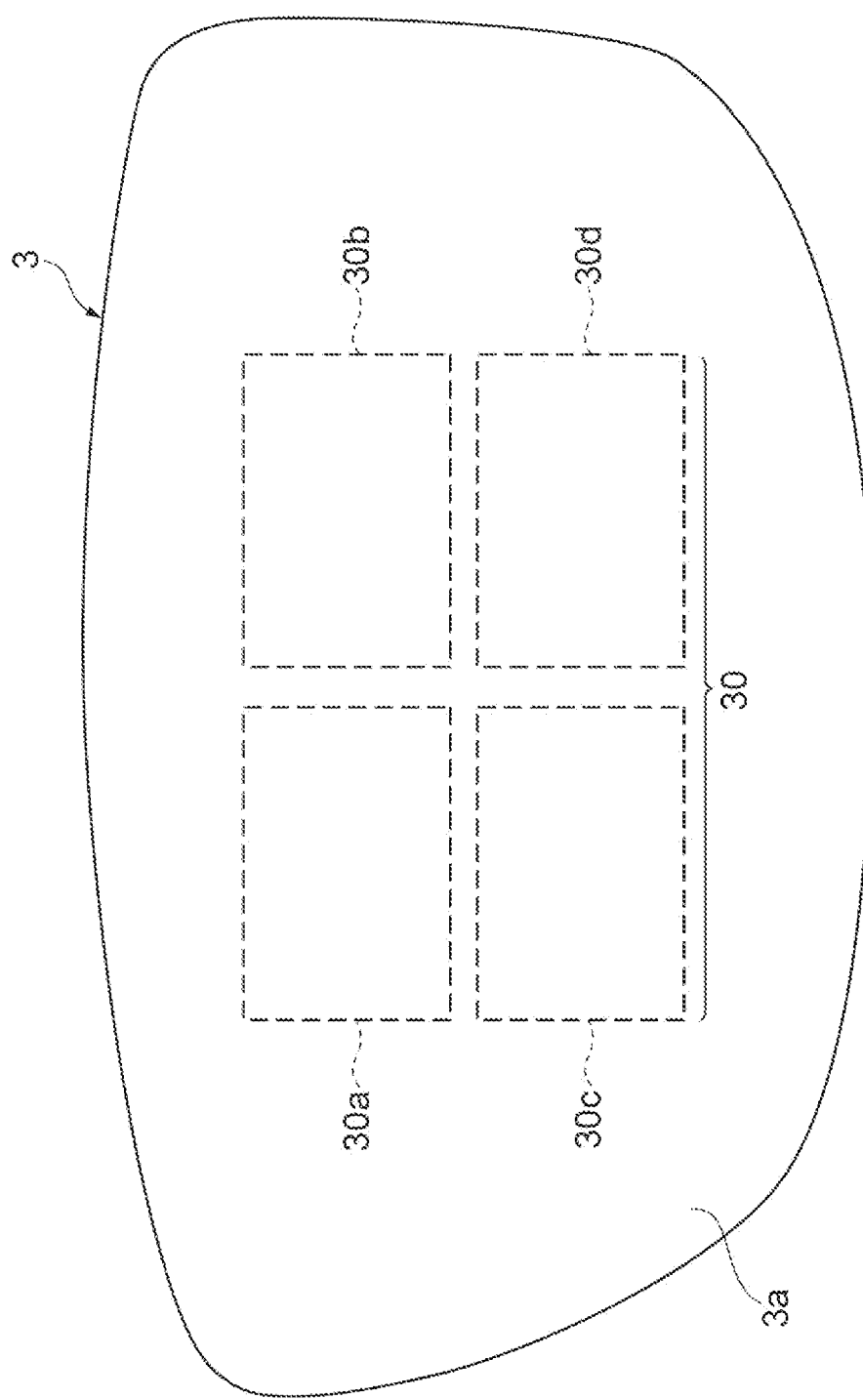
FIG. 19 is a diagram for explaining another example of a method for determining the irradiation range in accordance with the position of the pupil.

As shown in FIG. 19, the reflector 30 may be divided into a plurality of sections. In the example shown in FIG. 19, the reflector 30 is divided into four sections (section 30a, section 30b, section 30c, and section 30d). In this case, the controller 26 may determine one of the plurality of sections as the irradiation range of the laser light Ls. Specifically, the controller 26 detects the position of the pupil PP in the same manner as in the above-described embodiments, and determines a section capable of applying the reflected light Lr to the position of the pupil PP among the plurality of sections as the irradiation range of the laser light Ls. In this modification example, since any section just has to be determined as the irradiation range in accordance with the position of the pupil PP, the control of the projector module 27 by the controller 26 can be simplified.

The projector module 27 may further include at least one of the laser driver 24, the mirror driver 25, and the controller 26.

Figure 20:
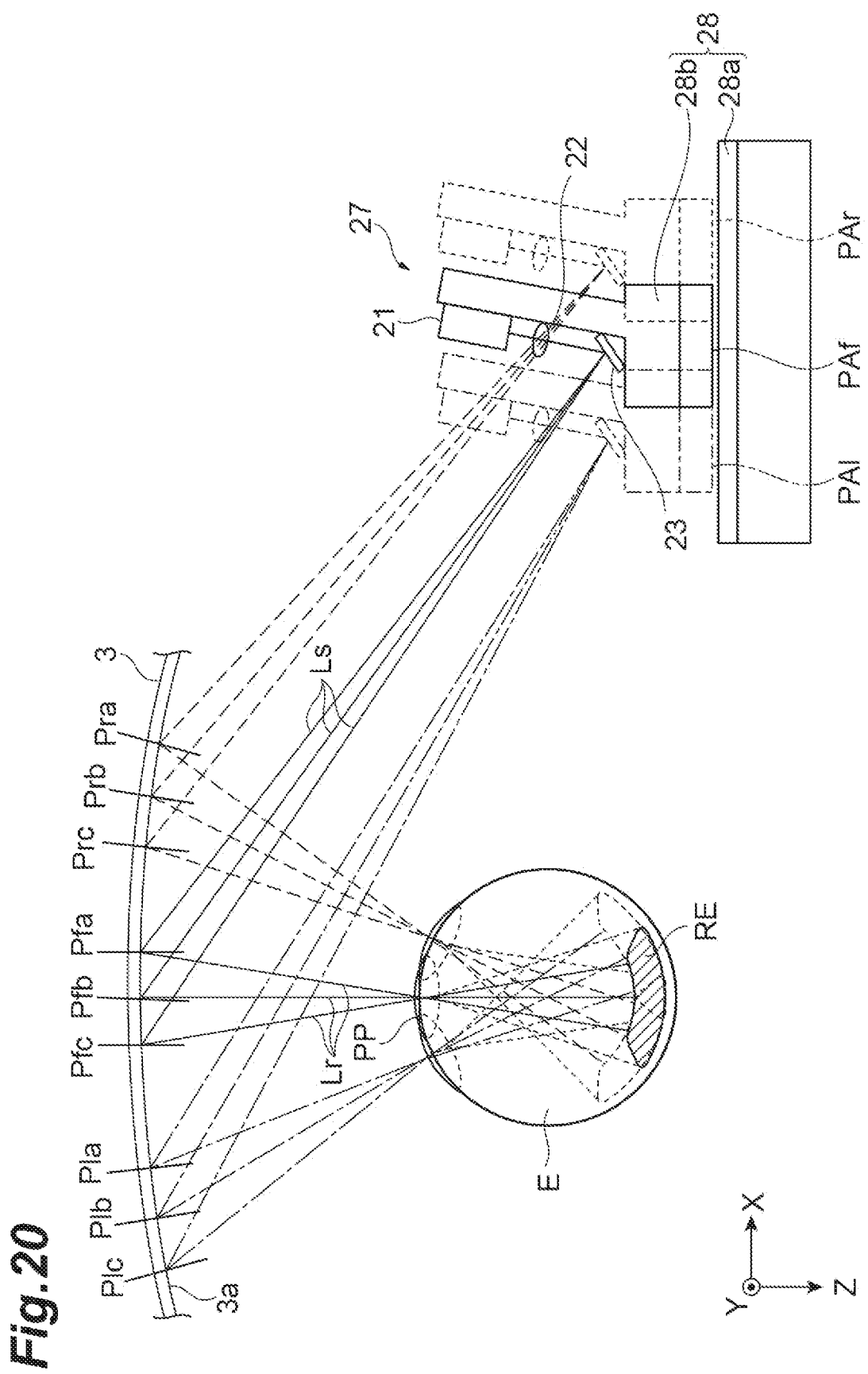
FIG. 20 is a diagram for explaining a modification example of the retinal projection device shown in FIG. 1.

As shown in FIG. 20, the optical engine 20 may include a movement mechanism 28 for moving the projector module 27. The movement mechanism 28 moves the projector module 27 in the X-axis direction, for example. In the present modification example, the movement mechanism 28 includes a guide rail 28a and a stage 28b.

The guide rail 28a extends linearly along the X-axis direction. The guide rail 28a defines a moving path of the stage 28b. The stage 28b is a member for supporting the projector module 27 so as to be movable in the X-axis direction. The stage 28b moves along the guide rail 28a. The stage 28b is driven by a linear actuator, for example. The light source unit 21 and the optical components 22 are fixed to the stage 28b. The movable mirror 23 is attached to the stage 28b so as to be swingable about an axis extending in the X-axis direction and about an axis extending in the Y-axis direction. The relative positional relationship between the light source unit 21, the optical components 22, and the movable mirror 23 is fixed regardless of the position of the stage 28b. At least one of the laser driver 24, the mirror driver 25, and the controller 26 may be further mounted on the stage 28b.

The controller 26 causes the movement mechanism 28 to move the projector module 27 in accordance with the position of the pupil PP. For example, when the pupil PP faces the front (when the pupil PP is located at the center of the eye box in the left-right direction), the controller 26 controls the movement mechanism 28 so that the stage 28b is located at the position PAf. When the pupil PP is directed to the right (when the pupil PP is located at the right end of the eye box), the controller 26 controls the movement mechanism 28 so that the stage 28b is located at the position PAr. When the pupil PP is directed to the left (when the pupil PP is located at the left end of the eye box), the controller 26 controls the movement mechanism 28 so that the stage 28b is located at the position PAl.

There is a limit to the range to which the laser light Ls can be applied only by controlling the movable mirror 23. To address this problem, in the above-described modification example, the controller 26 controls the movement mechanism 28 to move the projector module 27 (light source unit 21, optical components 22, and movable mirror 23) to a position corresponding to the position of the pupil PP. As a result, the range to which the laser light Ls can be applied can be expanded.

(Additional Statements)

[Clause 1]

A retinal projection device to be mounted on a near eye wearable device, the retinal projection device comprising:
 a projector module including a light source configured to emit laser light and a movable mirror configured to perform scanning with the laser light;
 a reflector configured to project an image onto a retina of a user wearing the near eye wearable device by reflecting the laser light having passed through the movable mirror and irradiating the retina with reflected light; and
 a controller configured to determine an irradiation range of the reflector to be irradiated with the laser light in accordance with a position of a pupil of the user and to control the projector module to irradiate the irradiation range with the laser light,
 wherein the reflector includes a plurality of unit regions provided along a surface of a lens of the near eye wearable device, and the surface faces an eyeball of the user,
 wherein each of the plurality of unit regions is a nanostructure configured to reflect the laser light at a reflection angle corresponding to a position where the unit region is provided when the laser light having passed through the movable mirror is incident on the unit region, and
 wherein the irradiation range is a part of the plurality of unit regions.

[Clause 2]

The retinal projection device according to clause 1,
 wherein the controller determines a first irradiation range as the irradiation range when the pupil is located at a first position, and determines a second irradiation range as the irradiation range when the pupil is located at a second position different from the first position, and
 wherein the first irradiation range partially overlaps the second irradiation range.

[Clause 3]

The retinal projection device according to clause 1,
 wherein the reflector is divided into a plurality of sections, and
 wherein the controller determines one of the plurality of sections as the irradiation range.

[Clause 4]

The retinal projection device according to any one of clauses 1 to 3, further comprising a movement mechanism configured to move the projector module,
 wherein the controller causes the movement mechanism to move the projector module in accordance with the position of the pupil.

[Clause 5]

The retinal projection device according to any one of clauses 1 to 4,
 wherein the laser light contains a first component for projecting an image onto the retina and a second component for detecting the position of the pupil, and
 wherein the plurality of unit regions includes a unit region for the first component and a unit region for the second component.

[Clause 6]

The retinal projection device according to any one of clauses 1 to 5,
 wherein each of the plurality of unit regions is a laminate including a first metal layer, a dielectric layer, and a second metal layer in sequence in a first direction intersecting the surface, and
 wherein the second metal layer includes a plurality of metal bodies arranged in a second direction intersecting the first direction.

[Clause 7]

The retinal projection device according to clause 6,
 wherein each of the plurality of unit regions has a length in accordance with the reflection angle in the second direction, and
 wherein a size of each of the plurality of metal bodies is set so that a phase change amount of the reflected light linearly increases or decreases from a first end toward a second end in the second direction of the unit region.

[Clause 8]

A near eye wearable device comprising:
 the retinal projection device according to any one of clauses 1 to 7; and
 the lens.

What is claimed is:

1. A retinal projection device to be mounted on a near eye wearable device, the retinal projection device comprising:
 a projector module including a light source configured to emit laser light and a movable mirror configured to perform scanning with the laser light;
 a reflector configured to project an image onto a retina of a user wearing the near eye wearable device by reflecting the laser light having passed through the movable mirror and irradiating the retina with reflected light; and
 a controller configured to determine an irradiation range of the reflector to be irradiated with the laser light in accordance with a position of a pupil of the user and to control the projector module to irradiate the irradiation range with the laser light, wherein the reflector includes a plurality of unit regions provided along a surface of a lens of the near eye wearable device, and the surface faces an eyeball of the user, each of the plurality of unit regions is a nanostructure configured to reflect the laser light at a reflection angle corresponding to a position where the unit region is provided when the laser light having passed through the movable mirror is incident on the unit region, the irradiation range is a part of the plurality of unit regions, the controller determines a first irradiation range as the irradiation range when the pupil is located at a first position, and determines a second irradiation range as the irradiation range when the pupil is located at a second position different from the first position, and the first irradiation range partially overlaps the second irradiation range.

2. The retinal projection device according to claim 1, further comprising a movement mechanism configured to move the projector module, wherein the controller causes the movement mechanism to move the projector module in accordance with the position of the pupil.

3. The retinal projection device according to claim 1, wherein the laser light contains a first component for projecting an image onto the retina and a second component for detecting the position of the pupil, and the plurality of unit regions includes a unit region for the first component and a unit region for the second component.

4. The retinal projection device according to claim 1, wherein each of the plurality of unit regions is a laminate including a first metal layer, a dielectric layer, and a second metal layer in sequence in a first direction intersecting the surface, and the second metal layer includes a plurality of metal bodies arranged in a second direction intersecting the first direction.

5. A near eye wearable device comprising:

the retinal projection device according to claim 1; and
the lens.

6. A retinal projection device to be mounted on a near eye wearable device, the retinal projection device comprising:

a projector module including a light source configured to emit laser light and a movable mirror configured to perform scanning with the laser light;

a reflector configured to project an image onto a retina of a user wearing the near eye wearable device by reflecting the laser light having passed through the movable mirror and irradiating the retina with reflected light; and a controller configured to determine an irradiation range of the reflector to be irradiated with the laser light in accordance with a position of a pupil of the user and to control the projector module to irradiate the irradiation range with the laser light, wherein the reflector includes a plurality of unit regions provided along a surface of a lens of the near eye wearable device, and the surface faces an eyeball of the user, each of the plurality of unit regions is a nanostructure configured to reflect the laser light at a reflection angle corresponding to a position where the unit region is provided when the laser light having passed through the movable mirror is incident on the unit region, the irradiation range is a part of the plurality of unit regions, each of the plurality of unit regions is a laminate including a first metal layer, a dielectric layer, and a second metal layer in sequence in a first direction intersecting the surface, the second metal layer includes a plurality of metal bodies arranged in a second direction intersecting the first direction, each of the plurality of unit regions has a length in accordance with the reflection angle in the second direction, and a size of each of the plurality of metal bodies is set so that a phase change amount of the reflected light linearly increases or decreases from a first end toward a second end in the second direction of the unit region.

7. The retinal projection device according to claim 6, wherein the reflector is divided into a plurality of sections, and
the controller determines one of the plurality of sections as the irradiation range.

* * * * *